(12) United States Patent
Sato et al.

(10) Patent No.: US 11,384,821 B2
(45) Date of Patent: Jul. 12, 2022

(54) BALL SCREW DEVICE

(71) Applicant: NSK LTD., Tokyo (JP)

(72) Inventors: Kanta Sato, Kanagawa (JP); Yasuaki Abe, Kanagawa (JP); Kazuya Yamada, Kanagawa (JP); Motoshi Sakai, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/419,520

(22) PCT Filed: Feb. 12, 2020

(86) PCT No.: PCT/JP2020/005245
§ 371 (c)(1),
(2) Date: Jun. 29, 2021

(87) PCT Pub. No.: WO2020/166585
PCT Pub. Date: Aug. 20, 2020

(65) Prior Publication Data
US 2022/0042582 A1 Feb. 10, 2022

(30) Foreign Application Priority Data
Feb. 13, 2019 (JP) .............................. JP2019-023549

(51) Int. Cl.
*F16H 25/20* (2006.01)
*F16H 25/22* (2006.01)

(52) U.S. Cl.
CPC ................... *F16H 25/2214* (2013.01)

(58) Field of Classification Search
CPC ............. F16H 25/2214; F16H 25/2204; F16H 25/2228; F16H 25/20
See application file for complete search history.

(56) References Cited

U.S. PATENT DOCUMENTS 5,063,809 A * 11/1991 Schlenker ........... F16H 25/2214
                   74/424.86
5,373,755 A * 12/1994 Rohlinger ........... F16H 25/2214
                   74/424.86
(Continued)

FOREIGN PATENT DOCUMENTS

DE    10134873 A1   1/2002
EP     1134455 A1 * 9/2001 ......... F16H 25/2214
(Continued)

OTHER PUBLICATIONS

International Search Report for PCT/JP2020/005245 dated Apr. 7, 2020 [PCT/ISA/210].
(Continued)

*Primary Examiner* — Zakaria Elahmadi
(74) *Attorney, Agent, or Firm* — Sughrue Mion, PLLC

(57) ABSTRACT

A ball screw device includes: a screw shaft the outer peripheral surface of which has a first thread groove; a nut the inner peripheral surface of which is provided with a second thread groove that matches the first thread groove, and the outer peripheral surface of which is provided with a through hole; a plurality of balls that roll between the first thread groove and the second thread groove; a circulation component including a main body part and a pair of leg parts provided on both ends of the main body part, and that is provided on the nut; and a pin component that fixes the circulation component to the nut. Each of the leg parts is inserted into the through hole, the pin component is provided on the leg part in an overlapping manner, and the leg part is retained in the through hole by the pin component.

17 Claims, 22 Drawing Sheets

(56) References Cited

U.S. PATENT DOCUMENTS

| | | | |
|---|---|---|---|
| 6,425,302 B2 * | 7/2002 | Greubel | F16H 25/2214 |
| | | | 74/424.82 |
| 6,681,651 B2 * | 1/2004 | Fujita | F16H 25/2214 |
| | | | 74/424.82 |
| 9,657,820 B1 * | 5/2017 | Hsieh | F16H 57/0464 |
| 9,897,181 B1 * | 2/2018 | Lin | F16H 25/2214 |
| 9,927,011 B2 * | 3/2018 | Iwasaki | F16H 25/2223 |
| 2002/0026844 A1 | 3/2002 | Fujita | |
| 2009/0013811 A1 | 1/2009 | Hsu | |

FOREIGN PATENT DOCUMENTS

| | | |
|---|---|---|
| EP | 3 255 306 A1 | 12/2017 |
| JP | 2002-098212 A | 4/2002 |
| JP | 2005-042763 A | 2/2005 |
| JP | 2008-8454 A | 1/2008 |
| JP | 2013-050148 A | 3/2013 |
| JP | 2017-106583 A | 6/2017 |

OTHER PUBLICATIONS

Written Opinion for PCT/JP2020/005245 dated Apr. 7, 2020 [PCT/ISA/237].

Extended European Search Report dated Dec. 13, 2021 in European Application No. 20756391.7.

Notice of Reasons for Refusal dated Apr. 5, 2022 from the Japanese Patent Office in JP Application No. 2021-088438.

* cited by examiner

BALL SCREW DEVICE

CROSS REFERENCE TO RELATED APPLICATIONS

This application is a National Stage of International Application No. PCT/JP2020/005245 filed Feb. 12, 2020, claiming priority based on Japanese Patent Application No. 2019-023549 filed Feb. 13, 2019.

FIELD

The present invention relates to a ball screw device.

BACKGROUND

A ball screw device is known as a device for converting a rotational motion into a linear motion. The ball screw device includes a screw shaft, a nut, and a plurality of balls. For example, a ball screw device disclosed in Patent Literature 1 includes a return tube for circulating the balls, and an attachment component for attaching the return tube to the nut. The return tube includes a main body part, and a pair of leg parts formed on both ends of the main body part. A flat surface is provided on the outer periphery of the nut, the main body part is provided on the flat surface, and each of the leg parts is inserted into a through hole provided on the flat surface. The attachment component is a plate member made of a metal material. One end side of the attachment component presses the upper surface of the leg part, and on the flat surface outside of the leg part, the other end side of the attachment component is fixed to the flat surface with a bolt.

CITATION LIST

Patent Literature

Patent Literature 1: Japanese Patent Application Laid-open No. 2013-50148

SUMMARY

Technical Problem

In Patent Literature 1, to retain the return tube, an attachment component, which is a plate member made of a metal material, and a bolt for fastening the attachment component are required. Thus, the number of components for retaining the return tube is increased. Moreover, a threaded hole for fastening a bolt needs to be formed on the nut, and a screw tightening process is needed during assembly.

The present invention has been made in view of the above problems, and an object of the present invention is to provide a ball screw device that can retain a circulation component with a simple configuration.

Solution to Problem

To achieve the above object, a ball screw device according to an embodiment of the present invention, comprising: a screw shaft, an outer peripheral surface of the screw shaft having a first thread groove; a nut, an inner peripheral surface of the nut being provided with a second thread groove that matches the first thread groove, and an outer peripheral surface of the nut being provided with a through hole; a plurality of balls that roll between the first thread groove and the second thread groove; a circulation component including a main body part and a pair of leg parts provided on both ends of the main body part, the circulation component being provided on the nut; and a pin component that fixes the circulation component to the nut, wherein each of the leg parts is inserted into the through hole, and the pin component is provided on the leg part in an overlapping manner, and the leg part is retained in the through hole by the pin component.

According to the above, when the balls circulate the circulation component, the circulation component is displaced by the force applied by the balls. Because the pin component is provided radially outside of the leg part in an overlapping manner, the pin component can suppress the displacement of the circulation component. Consequently, there is no need to provide a plate member made of a metal material and a bolt, and the ball screw device can reduce the number of components for retaining the circulation component. Moreover, the ball screw device can omit a process of forming a threaded hole for fastening a bolt on the nut. Thus, the ball screw device can retain the circulation component with a simple configuration.

As a desirable embodiment of the ball screw device, the nut is provided with a pin insertion hole that is provided in a direction parallel to an axis direction of the nut, and that penetrates through an end surface of the nut in the axis direction and an inner wall of the through hole, and the pin component is provided in the pin insertion hole. According to the above, the pin component includes a portion provided in the pin insertion hole, and a portion that extends from the pin insertion hole to the inside of the through hole and that overlaps with the leg part. Moreover, the insertion direction of the pin component is orthogonal to the direction of the force applied to the circulation component by the balls. Thus, the ball screw device can retain the circulation component without fail.

As a desirable embodiment of the ball screw device, a lid component that covers an opening of the pin insertion hole is provided on the end surface. According to the above, the ball screw device can suppress the pin component from coming out from the pin insertion hole.

As a desirable embodiment of the ball screw device, the circulation component includes a first leg part provided on one end side of the main body part, and a second leg part provided on another end side of the main body part, and the nut is provided with a first through hole into which the first leg part is inserted, a second through hole into which the second leg part is inserted, a first pin insertion hole that is provided in a direction parallel to the axis direction of the nut, and that penetrates through a first end surface of the nut in the axis direction and an inner wall of the first through hole, and a second pin insertion hole that is provided in a direction parallel to the axis direction of the nut, and that penetrates through a second end surface on a side opposite to the first end surface and an inner wall of the second through hole. According to the above, the first pin insertion hole and the second pin insertion hole are provided on the corresponding first end surface and the second end surface that face each other in the axis direction. Thus, compared to when the first pin insertion hole and the second pin insertion hole are provided on the same end surface, the length of the first pin insertion hole and the second pin insertion hole in the axis direction can be suppressed. Hence, the ball screw device can easily form the first pin insertion hole and the second pin insertion hole on the nut.

As a desirable embodiment of the ball screw device, the circulation component includes a first leg part provided on one end side of the main body part, and a second leg part provided on another end side of the main body part, and the nut is provided with a first through hole into which the first leg part is inserted, a second through hole into which the second leg part is inserted, a first pin insertion hole that is provided in a direction parallel to the axis direction of the nut, and that penetrates through a first end surface of the nut in the axis direction and an inner wall of the first through hole, and a second pin insertion hole that is provided in a direction parallel to the axis direction of the nut, and that penetrates through the first end surface and an inner wall of the second through hole. According to the above, the first pin insertion hole and the second insertion hole are provided on the same first end surface. Thus, the pin component can be easily inserted into the first pin insertion hole and the second pin insertion hole. Moreover, by providing a lid member on one of the end surfaces, it is possible to suppress the first pin component and the second pin component from coming out from the corresponding first pin insertion hole and the second pin insertion hole.

As a desirable embodiment of the ball screw device, the nut is provided with a pin insertion hole that is provided in a direction parallel to an end surface of the nut in an axis direction, and in a direction intersecting with the through hole, and that penetrates through an outer peripheral surface of the nut and an inner wall of the through hole, and the pin component is provided in the pin insertion hole. According to the above, even in a case when the end surface of the nut in the axis direction cannot be processed, it is possible to provide the pin insertion hole on the nut, and insert the pin component into the pin insertion hole from the outer peripheral surface side of the nut.

As a desirable embodiment of the ball screw device, the pin component is inserted into a pin insertion part surrounded by an inner wall of the through hole and an upper surface of the leg part. According to the above, the pin component is provided radially outside of the leg part, and is fixed to the inside of the through hole. Consequently, the ball screw device can retain the circulation component. Moreover, the ball screw device can omit a process of forming the pin insertion hole on the nut.

A ball screw device according to an embodiment of the present invention, comprising: a screw shaft, an outer peripheral surface of the screw shaft having a first thread groove; a nut, an inner peripheral surface of the nut being provided with a second thread groove that matches the first thread groove, and an outer peripheral surface of the nut being provided with a through hole; a plurality of balls that roll between the first thread groove and the second thread groove; a circulation component including a main body part and a pair of leg parts provided on both ends of the main body part, the circulation component being provided on the nut; and a pin component that fixes the circulation component to the nut, wherein each of the leg parts is inserted into the through hole, and the pin component is inserted into a pin insertion concave part provided on the leg part, and the leg part is retained in the through hole by the pin component.

According to the above, when the inner surface of the pin insertion concave part and the pin component come into contact with each other, the displacement of the circulation component can be suppressed. Hence, because there is no need to provide a plate member made of a metal material and a bolt, the ball screw device can reduce the number of components for retaining the circulation component. Moreover, the ball screw device can omit a process of forming a threaded hole for fastening a bolt on the nut. Thus, the ball screw device can retain the circulation component with a simple configuration.

As a desirable embodiment of the ball screw device, the nut is provided with a pin insertion hole that is provided in a direction parallel to an axis direction of the nut, and that penetrates through an end surface of the nut in the axis direction and an inner wall of the through hole, and the pin component is pressed into the pin insertion concave part provided on the leg part and the pin insertion hole. According to the above, the ball screw device can suppress the pin component from coming out from the pin insertion concave part, and effectively retain the circulation component.

As a desirable embodiment of the ball screw device, a circulation component attachment groove that communicates with the through hole is provided on the outer peripheral surface of the nut, and the main body part is provided in the circulation component attachment groove. According to the above, even in a case when the force in the peripheral direction of the nut is applied to the main body part, when the main body part comes into contact with the wall surface of the circulation component attachment groove, the displacement of the main body part can be suppressed. Moreover, because the leg part of the circulation component is fixed to the nut by the pin component, there is no need to provide a member for fixing the main body part, on the circulation component attachment groove and the upper side of the main body part. Thus, compared to when the circulation component is fixed by providing an attachment component on the upper side of the main body part, the size of the ball screw device can be reduced.

As a desirable embodiment of the ball screw device, in a direction perpendicular to a lower surface of the main body part of the circulation component, the lower surface of the main body part is positioned at a same position as the upper surface of the leg part. According to the above, compared to when the upper surface of the leg part is provided at a position different from that of the lower surface of the main body part, for example, at a position close to the center axis of the nut, the leg part can be formed thicker. Hence, the ball screw device can improve the durability of the circulation component.

As a desirable embodiment of the ball screw device, the pin insertion hole intersects with the through hole, and is provided from one end surface side of the nut in the axis direction to another end surface side of the nut in the axis direction beyond the through hole, and the pin component is provided in the pin insertion hole. According to the above, the pin component can support the force applied to the circulation component by the balls, by both ends of the pin component at one end side and the other end side. Hence, because the load resistance of the pin component is increased, the ball screw device can effectively retain the circulation component.

As a desirable embodiment of the ball screw device, the pin component includes a first portion and a second portion coupled to each other in a longitudinal direction of the pin component, and an outer diameter of the second portion is larger than an outer diameter of the first portion, and the second portion is provided in the through hole. According to the above, it is possible to suppress the pin component from coming out from the through hole.

Advantageous Effects of Invention

With the present invention, it is possible to provide a ball screw device that can retain a circulation component with a simple configuration.

DESCRIPTION OF EMBODIMENTS

Hereinafter, the present invention will be described in detail with reference to the accompanying drawings. However, the present invention is not limited to the mode for carrying out the invention described below (hereinafter, referred to as an embodiment). Moreover, components in the following embodiments include those that can be easily assumed by those skilled in the art, those that are substantially the same as those components, and those that fall within a so-called range of equivalents. Moreover, the components disclosed in the following embodiments can be combined as appropriate.

First Embodiment

Figure 1:
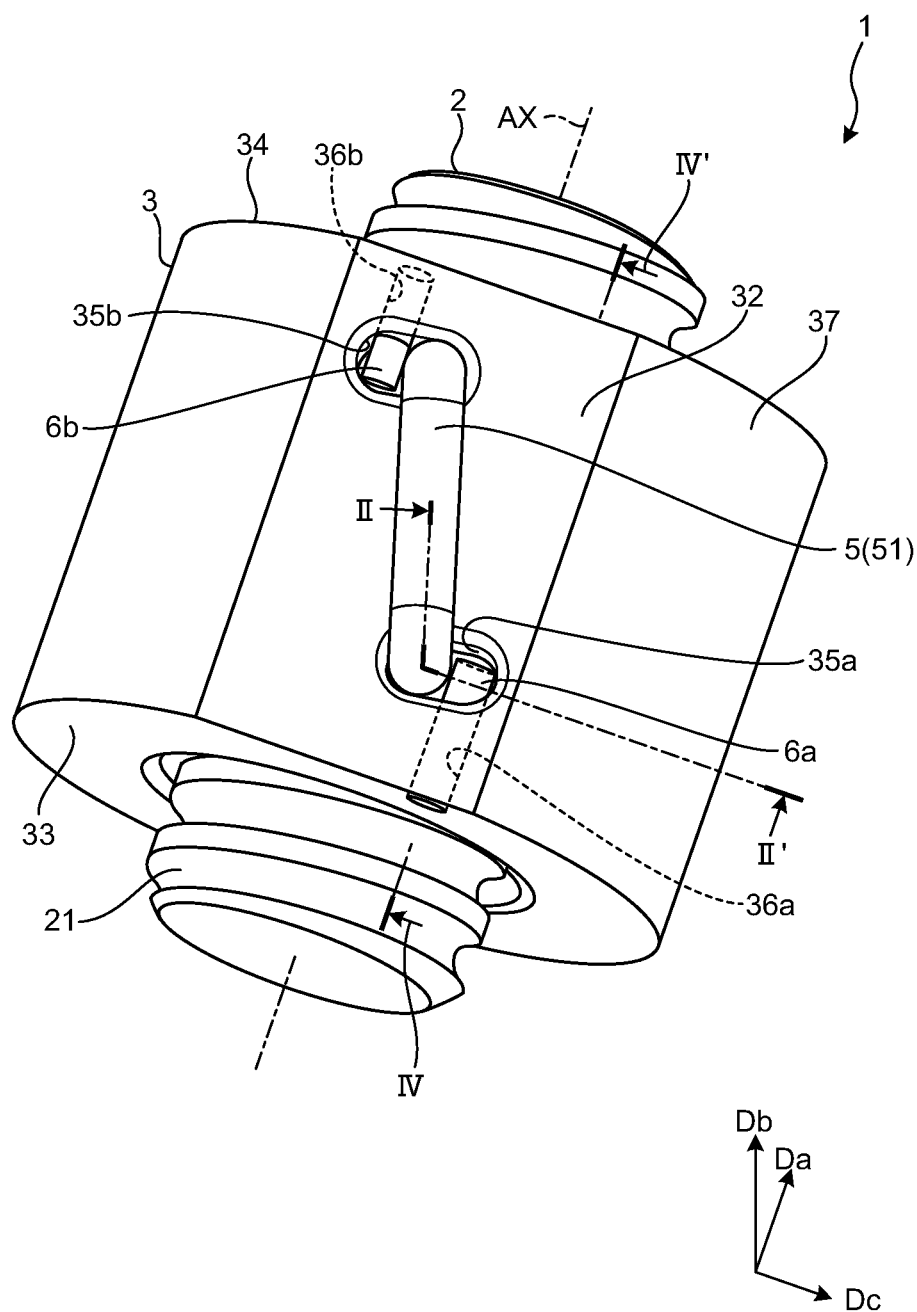
FIG. 1 is a perspective view of a ball screw device according to a first embodiment.

FIG. 1 is a perspective view of a ball screw device according to a first embodiment. As illustrated in FIG. 1, a ball screw device 1 includes a screw shaft 2, a nut 3, a plurality of balls 4 (see FIG. 2), a circulation component 5, a first pin component 6a, and a second pin component 6b.

A first thread groove 21 is provided on the outer peripheral surface of the screw shaft 2. The screw shaft 2 penetrates through the nut 3. The nut 3 is provided with a flat surface 32, a first through hole 35a, a second through hole 35b, a first pin insertion hole 36a, and a second pin insertion hole 36b.

In the following explanation, a direction along a center axis AX of the nut 3 is simply referred to as an axis direction. A direction orthogonal to the center axis AX of the nut 3 is simply referred to as a radial direction. The radial direction is a direction also referred to as a radiation direction. A direction parallel to the axis direction of the nut 3 is referred to as a first direction Da. A direction orthogonal to the first direction Da is referred to as a second direction Db and a third direction Dc. A plane defined by the first direction Da and the third direction Dc is parallel to the flat surface 32. The flat surface 32 is provided on a part of an outer peripheral surface 37 of the nut 3. The second direction Db is a direction perpendicular to the flat surface 32.

The first through hole 35a and the second through hole 35b are each provided in the second direction Db, and penetrate through the flat surface 32 and the inner peripheral surface of the nut 3. When viewed from the second direction Db, the first through hole 35a and the second through hole 35b each have an opening in an elliptical shape having a longitudinal length in the third direction Dc.

The nut 3 includes a first end surface 33 intersecting the first direction Da and a second end surface 34 on the side opposite to the first end surface 33. The first pin insertion hole 36a is provided in the first direction Da, and penetrates through the first end surface 33 and the inner wall of the first through hole 35a. The second pin insertion hole 36b is provided in the first direction Da, and penetrates through the second end surface 34 and the inner wall of the second through hole 35b. The first pin insertion hole 36a and the second pin insertion hole 36b are through holes the inner peripheral surface of which is not provided with a thread groove.

A main body part 51 of the circulation component 5 is provided on the flat surface 32. The main body part 51 extends in a direction inclined with respect to the axis direction of the nut 3. The circulation component 5 is a component for circulating the balls 4, and may also be referred to as a return tube. A circulation path 5m (see FIG. 2) is formed in the circulation component 5, and the circulation path 5m joins one end side and the other end side of a rolling path 41 (see FIG. 2) formed between the screw shaft 2 and the nut 3.

The first pin component 6a and the second pin component 6b are provided radially outside of a corresponding first leg part 52a and a second leg part 52b (see FIG. 4) in an overlapping manner. The first leg part 52a is retained in the first through hole 35a by the first pin component 6a. The second leg part 52b is retained in the second through hole 35b by the second pin component 6b. The first pin component 6a and the second pin component 6b are components for fixing the circulation component 5 to the nut 3. Each of the first pin component 6a and the second pin component 6b is a cylindrical component made of a metal material, and the outer peripheral surface of which is not provided with a thread groove. The detailed fixing structure of the circulation component 5 by the first pin component 6a and the second pin component 6b will be described below.

The first leg part 52a, the first through hole 35a, the first pin insertion hole 36a, and the first pin component 6a; and the second leg part 52b, the second through hole 35b, the second pin insertion hole 36b, and the second pin component 6b are provided with the main body part 51 interposed therebetween. The configuration of the first leg part 52a, the first through hole 35a, the first pin insertion hole 36a, and the first pin component 6a at one side is similar to the configuration of the second leg part 52b, the second through hole 35b, the second pin insertion hole 36b, and the second pin component 6b at the other side. The first leg part 52a, the first through hole 35a, the first pin insertion hole 36a, and the first pin component 6a at one side and the second leg part 52b, the second through hole 35b, the second pin insertion hole 36b, and the second pin component 6b at the other side are arranged rotationally symmetric with respect to the direction intersecting the center axis AX (second direction Db) serving as the symmetry axis. Thus, the description on the first leg part 52a, the first through hole 35a, the first pin insertion hole 36a, and the first pin component 6a at one side is also applicable to the second leg part 52b, the second through hole 35b, the second pin insertion hole 36b, and the second pin component 6b at the other side.

Figure 2:
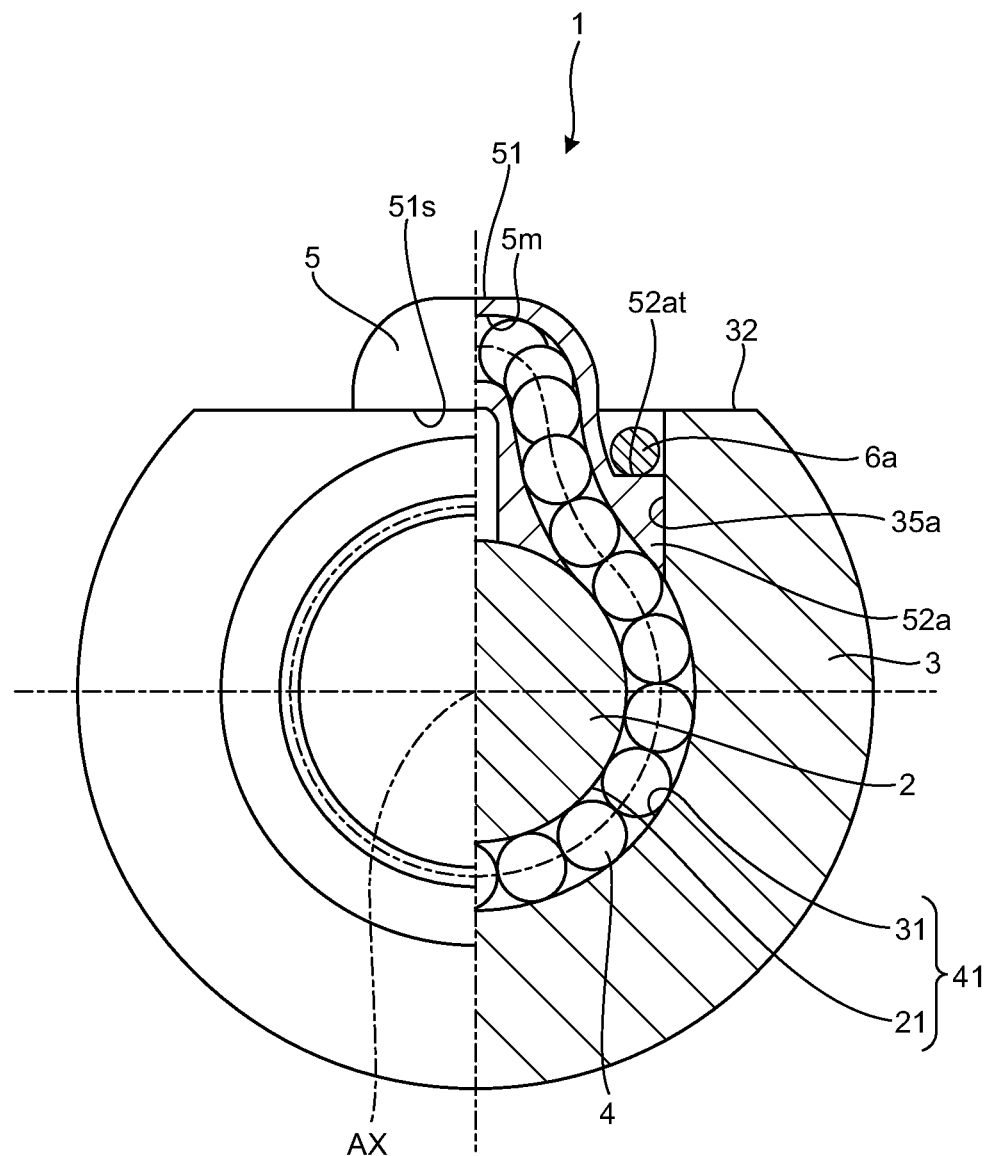
FIG. 2 is a partial sectional view of the ball screw device.
Figure 2:
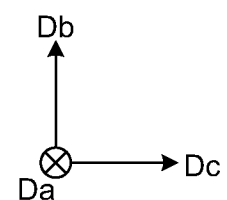

FIG. 2 is a partial sectional view of the ball screw device. FIG. 2 illustrates a partial section of the ball screw device 1, and illustrates a section cut along the line II-II' illustrated in FIG. 1.

As illustrated in FIG. 2, on the inner peripheral surface of the nut 3, a second thread groove 31 that matches the first thread groove 21 is provided. The first thread groove 21 and the second thread groove 31 form the rolling path 41 in a spiral shape. The balls 4 roll in the rolling path 41. Consequently, the relative motion of the screw shaft 2 and the nut 3 can be performed smoothly. When the screw shaft 2 is rotated, the nut 3 moves in the axis direction. Consequently, the ball screw device 1 converts a rotational motion into a linear motion. The ball screw device 1 is also applicable to a configuration in which the nut 3 is rotated and the screw shaft 2 moves in the axis direction, in addition to when the nut 3 moves in the axis direction.

The first through hole 35a penetrates through the flat surface 32 and the rolling path 41. The first leg part 52a of the circulation component 5 is inserted into the first through hole 35a. A lower surface 51s of the main body part 51 comes into contact with the flat surface 32. In the circulation component 5, the main body part 51 and the circulation path 5m that continues to a pair of the first leg part 52a and the second leg part 52b (see FIG. 4) are formed. The first leg part 52a and the second leg part 52b are configured so that the end part of the circulation path 5m is smoothly connected to the rolling path 41. Consequently, the balls 4 endlessly circulate the rolling path 41, by returning to the starting point of the rolling path 41 from the end point of the rolling path 41 through the circulation path 5m.

Figure 3:
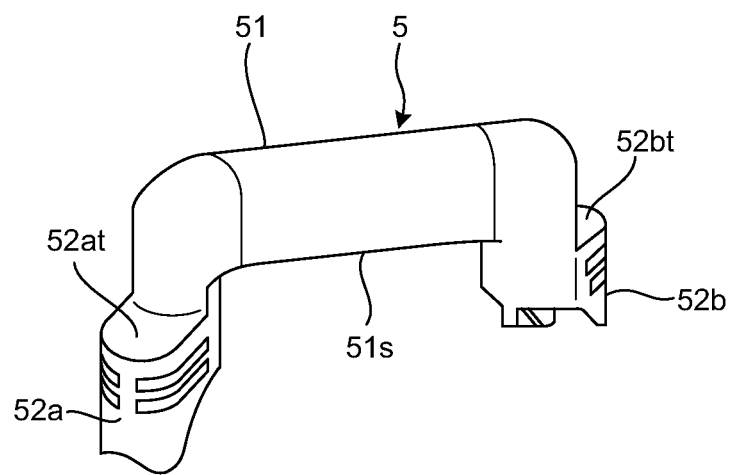
FIG. 3 is a perspective view of a circulation component.

FIG. 3 is a perspective view of a circulation component. As illustrated in FIG. 3, the circulation component 5 includes the main body part 51, the first leg part 52a, and the second leg part 52b. The first leg part 52a is provided on one end side of the main body part 51, and the second leg part 52b is provided on the other end side of the main body part 51. The first leg part 52a and the second leg part 52b each protrude in a direction inclined with respect to the extending direction of the main body part 51, and in a direction along the first thread groove 21 (rolling path 41). Consequently, the end part of the circulation path 5m is smoothly connected to the rolling path 41. Protruded portions of the first leg part 52a and the second leg part 52b have upper surfaces 52at and 52bt, respectively. The upper surfaces 52at and 52bt are provided below the lower surface 51s of the main body part 51, in other words, provided at positions close to the center axis AX in the second direction Db.

The circulation component 5 is formed by injection molding of synthetic resin. The circulation component 5 may also be integrally formed. However, the circulation component 5 may have a configuration in which a plurality of members are combined.

Figure 4:
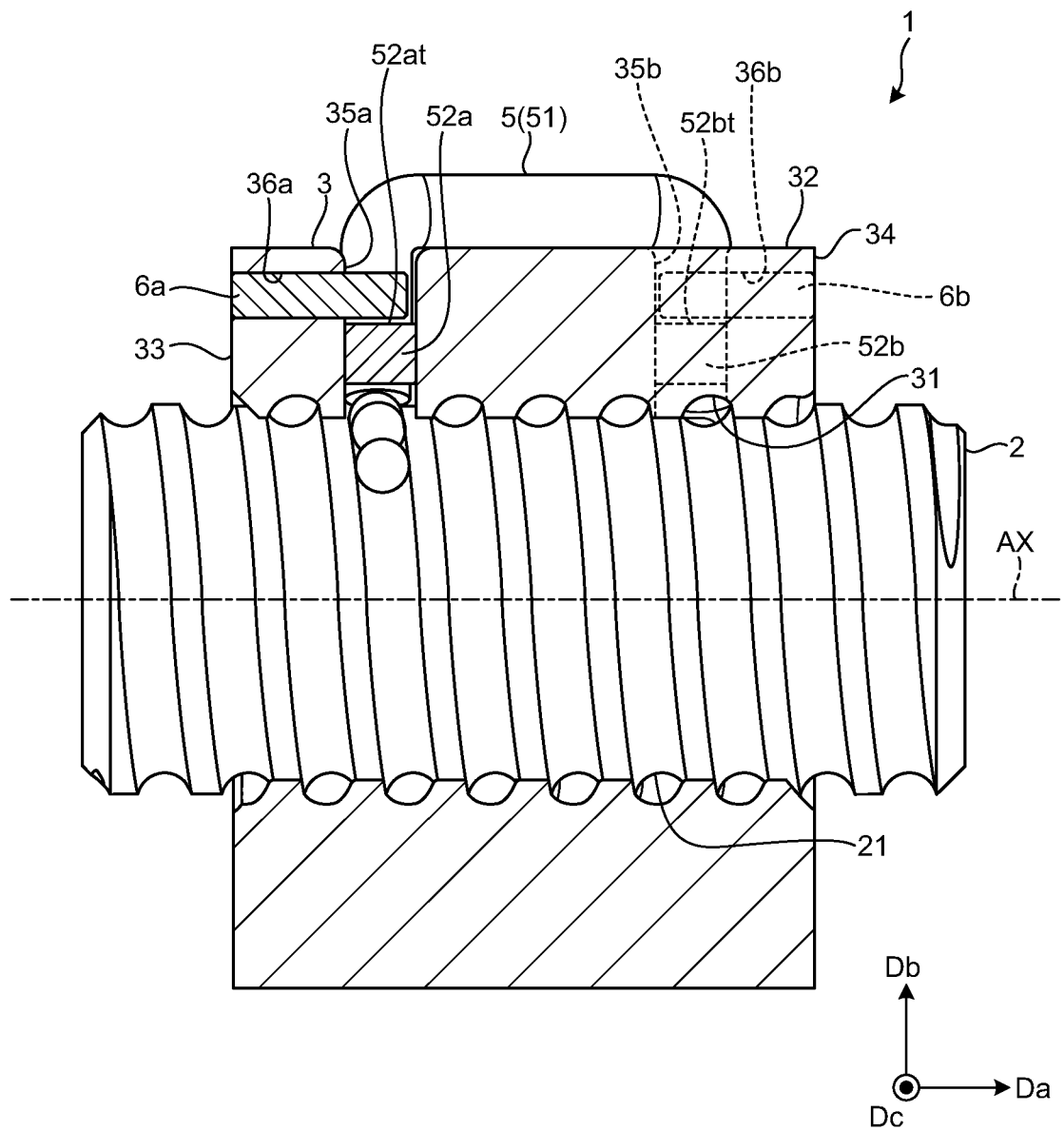
FIG. 4 is a sectional view cut along the line IV-IV' in FIG. 1.

Next, a fixing structure of the circulation component 5 to the nut 3 will be described. FIG. 4 is a sectional view cut along the line IV-IV' in FIG. 1. In FIG. 4, the second leg part 52b, the second through hole 35b, the second pin insertion hole 36b, and the second pin component 6b are illustrated by dotted lines.

As illustrated in FIG. 4, the first leg part 52a is inserted into the first through hole 35a. The upper surface 52at is provided at the inner side of the flat surface 32 in the radial direction, that is, provided at a position close to the center axis AX. The upper surface 52at is provided at the inner side of the first pin insertion hole 36a in the radial direction. In other words, the first leg part 52a in the second direction Db is provided at a position not overlapping with the opening of the first pin insertion hole 36a.

The first pin component 6a is inserted into the first pin insertion hole 36a, and protrudes from the inner wall of the first through hole 35a in the first direction Da. In the first through hole 35a, the first pin component 6a is positioned outside of the first leg part 52a in the radial direction. In other words, the first pin component 6a includes a portion provided in the first pin insertion hole 36a and a portion overlapping with the upper surface 52at of the first leg part 52a. Moreover, as illustrated in FIG. 1 and FIG. 2, the first pin component 6a is provided in an area surrounded by the inner wall of the first through hole 35a, the side surface of the main body part 51 of the circulation component 5, and the upper surface 52at of the first leg part 52a. The first pin component 6a is pressed into the first pin insertion hole 36a, and is fitted into the first pin insertion hole 36a while coming into contact with the inner wall of the first pin insertion hole 36a.

When the balls 4 circulate the circulation component 5, an upward force in the second direction Db is applied to the circulation component 5 by the balls 4. In other words, a force in the direction away from the flat surface 32 is applied to the circulation component 5. In this case, when the circulation component 5 is displaced in the direction away from the flat surface 32 by the force applied by the balls 4, the upper surface 52at of the first leg part 52a comes into contact with the first pin component 6a. Consequently, the first pin component 6a can suppress the displacement of the circulation component 5.

The second leg part 52b and the second pin component 6b also have the same configuration, and the second pin component 6b is inserted into the second pin insertion hole 36b provided on the second end surface 34. In the second through hole 35b, the second pin component 6b is positioned outside of the second leg part 52b in the radial direction. Consequently, when the upper surface 52bt of the second leg part 52b comes into contact with the second pin component 6b, the second pin component 6b can suppress the displacement of the circulation component 5.

The end part of the first pin component 6a in the axis direction is separated from the inner wall of the first through hole 35a with a small gap therebetween. However, it is not limited thereto. The end part of the first pin component 6a in the axis direction may come into contact with the inner wall of the first through hole 35a. The first pin insertion hole 36a may also intersect with the first through hole 35a, and may be provided up to the second end surface 34 side beyond the first through hole 35a. The position of the end part of the first pin component 6a at the first end surface 33 side is matched with the first end surface 33. However, it is not limited thereto. The end part of the first pin component 6a at the first end surface 33 side may protrude from the first end surface 33, or may be positioned at the inner side of the first end surface 33, in other words, in the first through hole 35a.

Moreover, the first leg part 52a and the second leg part 52b are retained by the similar configuration, by the corresponding first pin component 6a and the second pin component 6b. However, it is not limited thereto. The configuration of the first through hole 35a, the first pin insertion hole 36a, and the first pin component 6a may be different from the configuration of the second through hole 35b, the second pin insertion hole 36b, and the second pin component 6b. The shape of the first pin component 6a and the second pin component 6b is merely an example, and may be changed as appropriate. For example, in FIG. 4, the first pin component 6a and the second pin component 6b have the same diameter from one end side to the other end side. However, the first pin component 6a and the second pin component 6b may also have a portion with a different diameter.

As described above, the ball screw device 1 includes the screw shaft 2, the nut 3, the balls 4, the circulation component 5, and the pin component (first pin component 6a). The screw shaft 2 has the first thread groove 21 on the outer peripheral surface. The inner peripheral surface of the nut 3 is provided with the second thread groove 31 that matches the first thread groove 21, and the outer peripheral surface of the nut 3 is provided with the through hole (first through hole 35a). The balls 4 roll between the first thread groove 21 and the second thread groove 31. The circulation component 5 includes the main body part 51 and the pair of leg parts (first leg part 52a and second leg part 52b) provided on both ends of the main body part 51, and is provided on the nut 3. The pin component (first pin component 6a) fixes the circulation component 5 to the nut 3. The first leg part 52a is inserted into the first through hole 35a. The first pin component 6a is provided on the first leg part 52a in an overlapping manner. The first leg part 52a is retained in the first through hole 35a by the first pin component 6a.

According to the above, when the balls 4 circulate the circulation component 5, the circulation component 5 is displaced by the force applied by the balls 4. Because the first pin component 6a is provided radially outside of the first leg part 52a in an overlapping manner, the first pin component 6a can suppress the displacement of the circulation component 5. Hence, the ball screw device 1 can retain the circulation component 5 by the first pin component 6a. Thus, compared to a configuration in which the circulation component 5 is fixed to the nut 3 by fastening a plate member made of a metal material with a bolt, there is no need to provide a plate member made of a metal material and a bolt, and the ball screw device 1 can reduce the number of components for retaining the circulation component 5. Moreover, the ball screw device 1 can omit a process of forming a threaded hole for fastening a bolt on the nut 3. Thus, the ball screw device 1 can retain the circulation component 5 with a simple configuration.

Furthermore, in the ball screw device 1, the nut 3 is provided with the first pin insertion hole 36a that is provided in the direction parallel to the axis direction of the nut 3, and that penetrates through the first end surface 33 of the nut 3 in the axis direction and the inner wall of the first through hole 35a. The first pin component 6a is provided in the first pin insertion hole 36a. According to the above, the first pin component 6a includes a portion provided in the first pin insertion hole 36a, and a portion that extends from the first pin insertion hole 36a to the inside of the first through hole 35a and that overlaps with the upper surface 52at of the first leg part 52a. The insertion direction of the first pin component 6a is orthogonal to the direction of the force applied to the circulation component 5 by the balls 4. Thus, the ball screw device 1 can retain the circulation component 5 without fail.

Still furthermore, in the ball screw device 1, the circulation component 5 includes the first leg part 52a provided on one end side of the main body part 51, and the second leg part 52b provided on the other end side of the main body part 51. The nut 3 is provided with the first through hole 35a, the second through hole 35b, the first pin insertion hole 36a, and the second pin insertion hole 36b. The first leg part 52a is inserted into the first through hole 35a. The second leg part 52b is inserted into the second through hole 35b. The first pin insertion hole 36a is provided in the direction parallel to the axis direction of the nut 3, and penetrates through the first end surface 33 of the nut 3 in the axis direction, and the inner wall of the first through hole 35a. The second pin insertion hole 36b is provided in the direction parallel to the axis direction of the nut 3, and penetrates through the second end surface 34 on the side opposite to the first end surface 33, and the inner wall of the second through hole 35b.

According to the above, the first pin insertion hole 36a and the second pin insertion hole 36b are provided on the corresponding first end surface 33 and the second end surface 34 that face each other in the axis direction. Thus, compared to when the first pin insertion hole 36a and the second pin insertion hole 36b are provided on the same end surface, the length of the first pin insertion hole 36a and the second pin insertion hole 36b in the axis direction can be suppressed. Hence, the ball screw device 1 can easily form the first pin insertion hole 36a and the second pin insertion hole 36b on the nut 3.

First Modification

Figure 5:
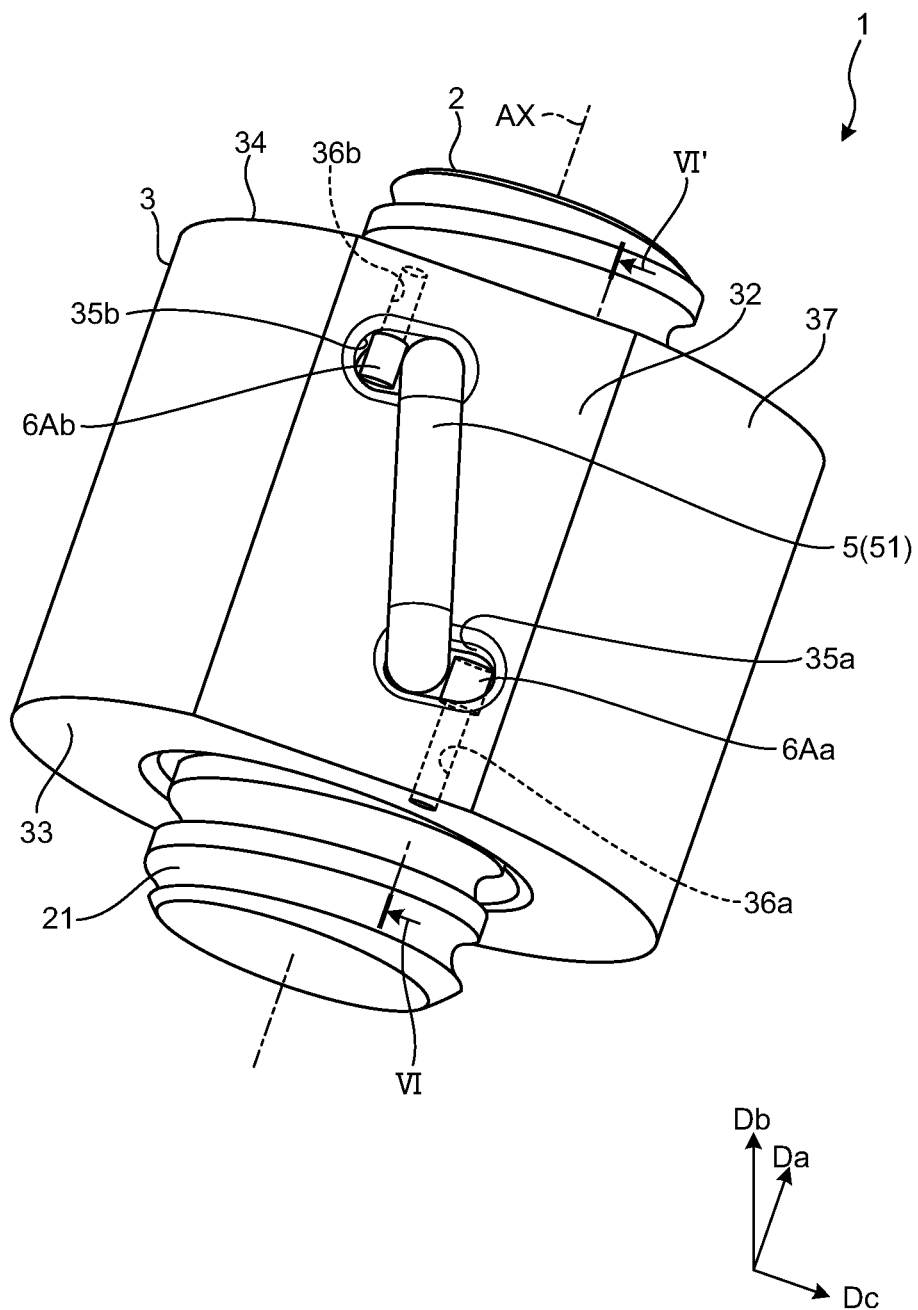
FIG. 5 is a perspective view of a ball screw device according to a first modification of the first embodiment.
Figure 6:
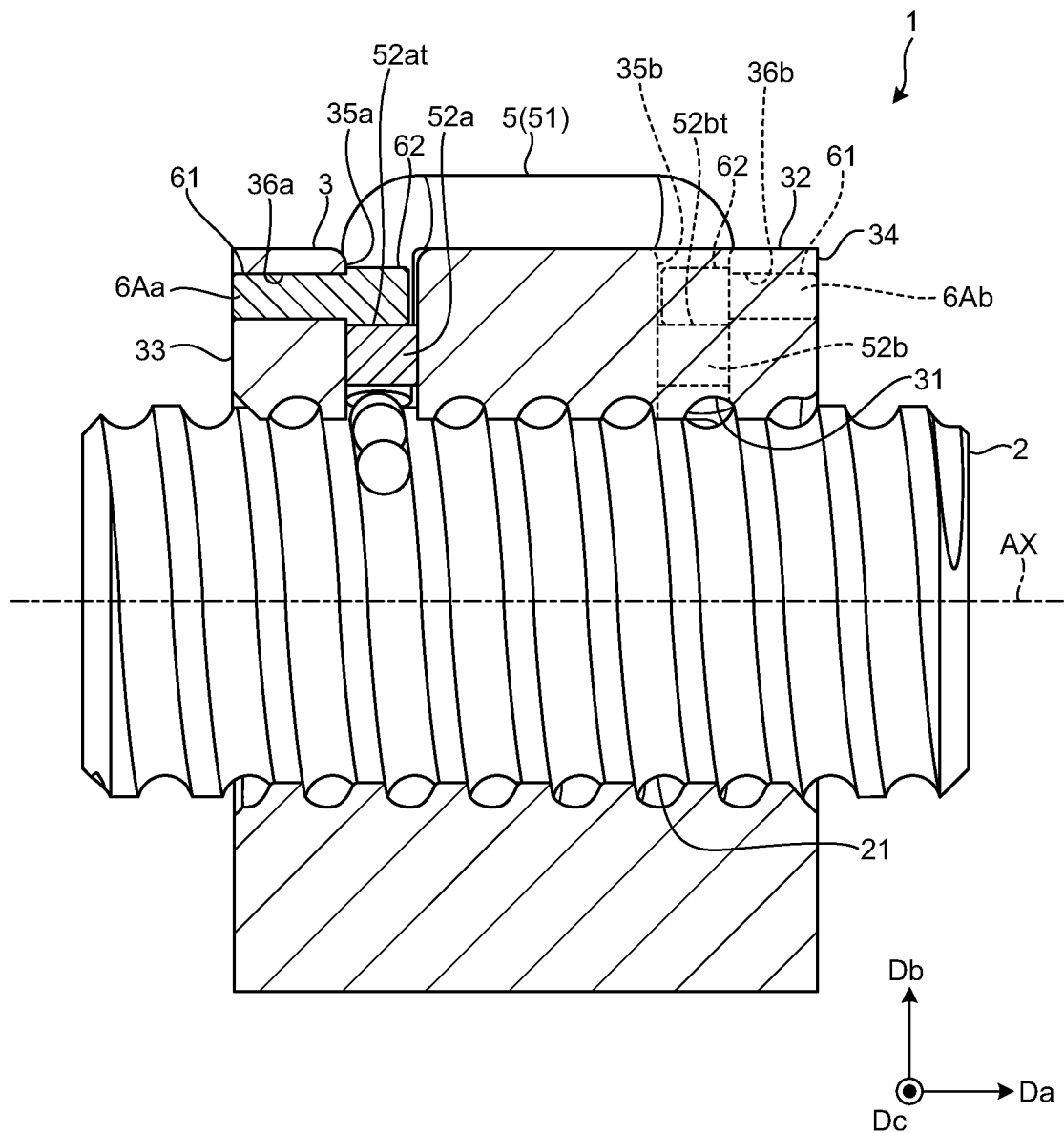
FIG. 6 is a sectional view cut along the line VI-VI' in FIG. 5.
Figure 7:
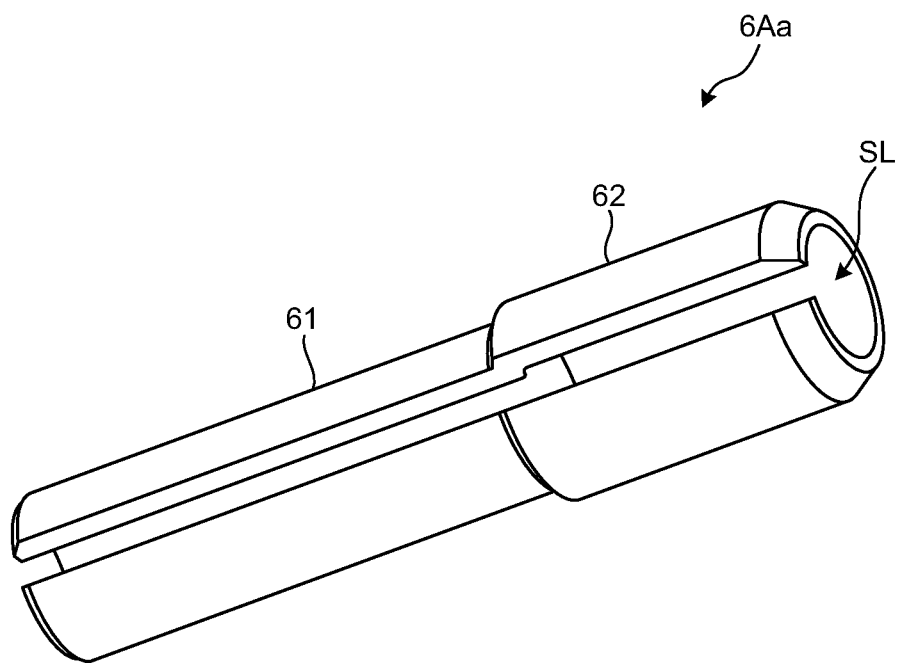
FIG. 7 is a perspective view of a first pin component in the ball screw device according to the first modification.

FIG. 5 is a perspective view of a ball screw device according to a first modification of the first embodiment. FIG. 6 is a sectional view cut along the line VI-VI' in FIG. 5. FIG. 7 is a perspective view of a first pin component in the ball screw device according to the first modification. As illustrated in FIG. 5, in the ball screw device 1 of the first modification, the shape of a first pin component 6Aa and a second pin component 6Ab is different from that of the first embodiment described above.

More specifically, as illustrated in FIG. 7, the first pin component 6Aa includes a first portion 61 and a second portion 62 coupled in the longitudinal direction of the first pin component 6Aa. The outer diameter of the second portion 62 is larger than the outer diameter of the first portion 61. Moreover, a slit SL is provided on the first pin component 6Aa across the first portion 61 and the second portion 62 along the longitudinal direction. Consequently, when the first pin component 6Aa is pressed into the first pin insertion hole 36a, the width of the slit SL in the peripheral direction is reduced, and the outer diameter of the second portion 62 is reduced. Consequently, the second portion 62 of the first pin component 6Aa passes through the first pin insertion hole 36a, and is provided in the first through hole 35a.

As illustrated in FIG. 6, the first portion 61 of the first pin component 6Aa is provided in the first pin insertion hole 36a, and the second portion 62 is provided in the first through hole 35a. The outer diameter of the second portion 62 provided in the first through hole 35a is increased by the elastic force, and becomes larger than the diameter of the first pin insertion hole 36a. A stepped part formed by the outer periphery of the second portion 62 and the outer periphery of the first portion 61 comes into contact with the inner wall of the first through hole 35a. Consequently, the ball screw device 1 can suppress the first pin component 6Aa from coming out from the first through hole 35a and the first pin insertion hole 36a.

In the first modification, the first pin component 6Aa is described. However, the description on the first pin component 6Aa is also applicable to the second pin component 6Ab. Moreover, the configuration of the first modification may be applicable to a second embodiment, a third embodiment, a fifth embodiment, a sixth embodiment, and a second modification to a fourth modification, which will be described below.

Second Modification

Figure 8:
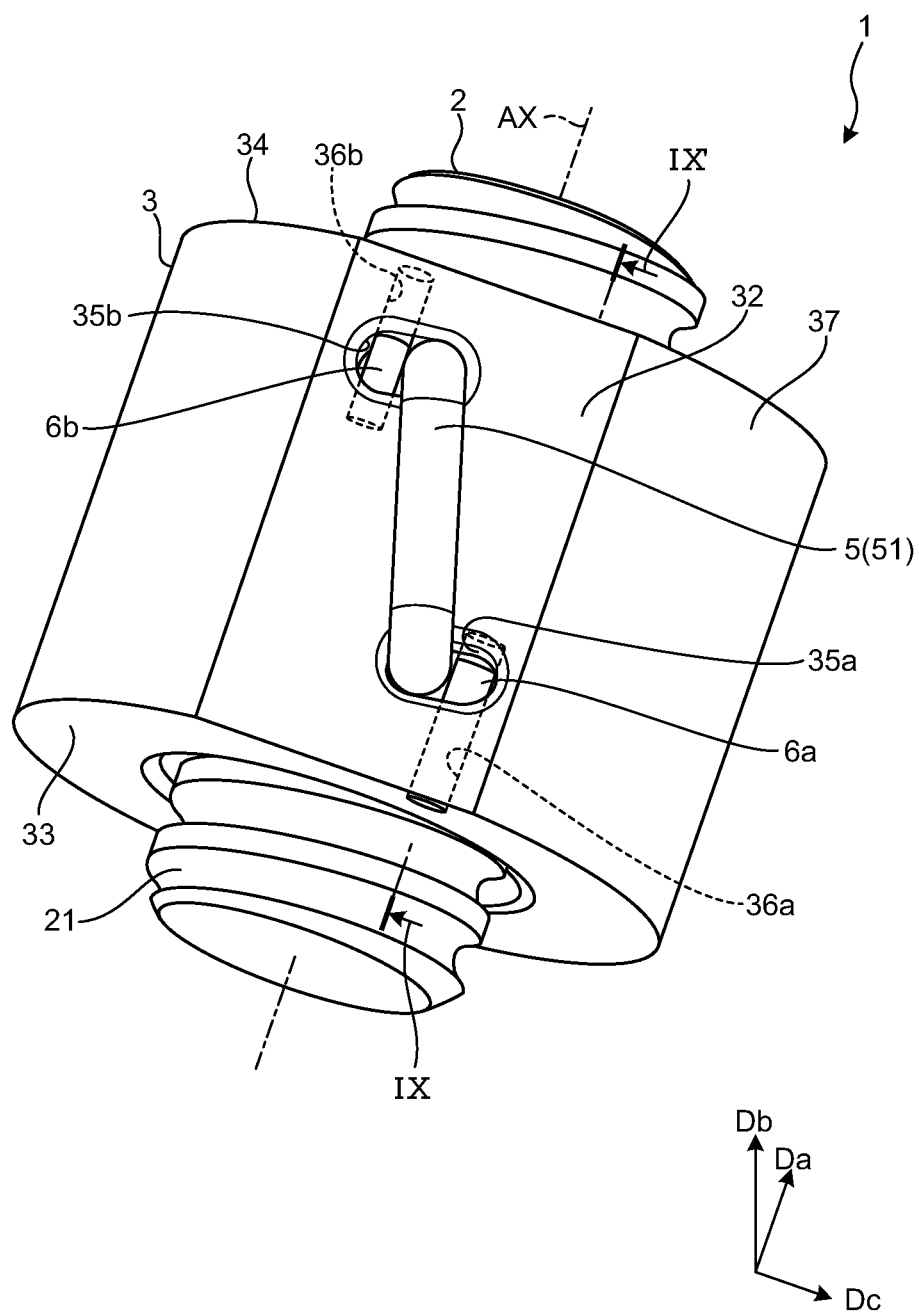
FIG. 8 is a perspective view of a ball screw device according to a second modification of the first embodiment.
Figure 9:
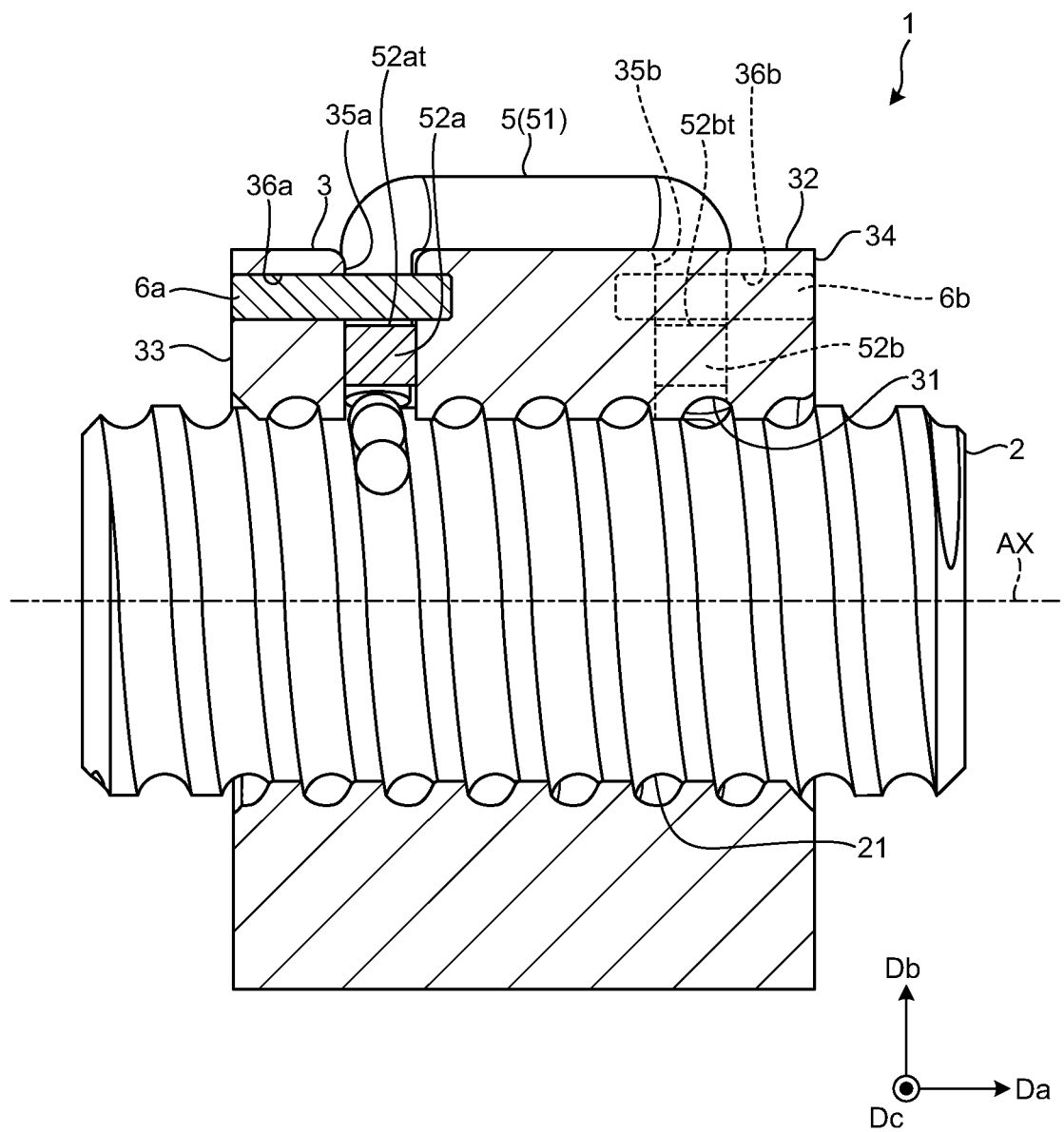
FIG. 9 is a sectional view cut along the line IX-IX' in FIG. 8.

FIG. 8 is a perspective view of a ball screw device according to a second modification of the first embodiment. FIG. 9 is a sectional view cut along the line IX-IX' in FIG. 8. As illustrated in FIG. 8 and FIG. 9, the configuration of the ball screw device 1 of the second modification is different from those of the first embodiment and the first modification described above in that the first pin insertion hole 36a and the second pin insertion hole 36b intersect with the corresponding first through hole 35a and the second through hole 35b.

More specifically, the first pin insertion hole 36a is provided from the first end surface 33 (one end surface) side of the nut 3 in the axis direction, to the second end surface 34 (the other end surface) side of the nut 3 in the axis direction beyond the first through hole 35a. The first pin component 6a is provided in the first pin insertion hole 36a. The end part of the first pin component 6a at the second end surface 34 side is positioned at the second end surface 34 side beyond the first leg part 52a. In other words, in the axis direction of the nut 3, the first leg part 52a is provided between one end and the other end of the first pin component 6a. Consequently, the first pin component 6a can support the force applied to the circulation component 5 by the balls 4, by both ends of the first pin component 6a at one end side and the other end side. In the ball screw device 1, the load resistance of the first pin component 6a is increased by making the first pin component 6a to have what is called a both-ends supported structure. Consequently, the ball screw device 1 can effectively retain the circulation component 5.

In the second modification, the first pin insertion hole 36a and the first pin component 6a are described. However, the description on the first pin insertion hole 36a and the first pin component 6a is also applicable to the second pin insertion hole 36b and the second pin component 6b. Moreover, the configuration of the second modification may be applicable to a second embodiment, a fifth embodiment, a sixth embodiment, a third modification, and a fourth modification, which will be described below.

Second Embodiment

Figure 10:
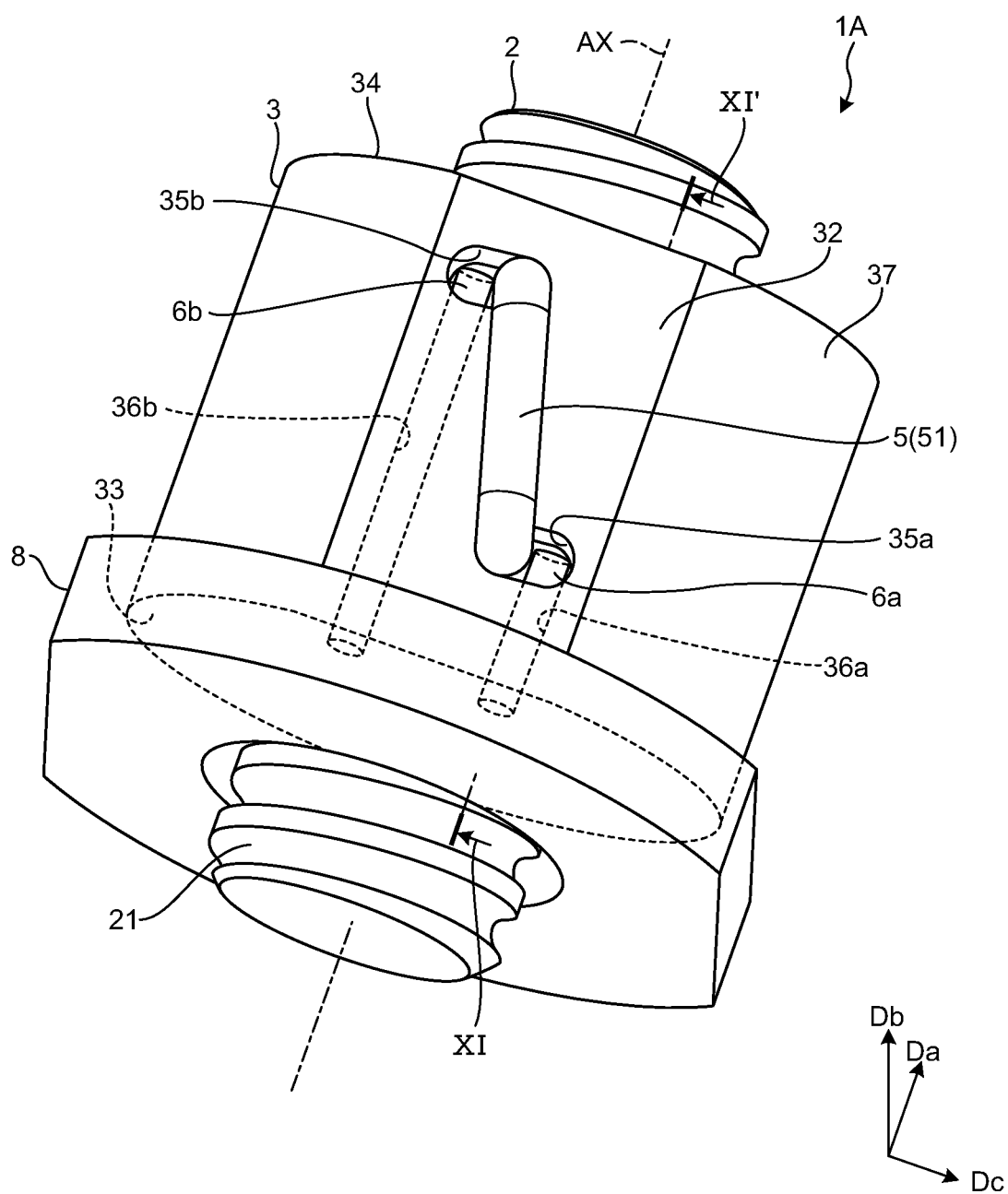
FIG. 10 is a perspective view of a ball screw device according to a second embodiment.
Figure 11:
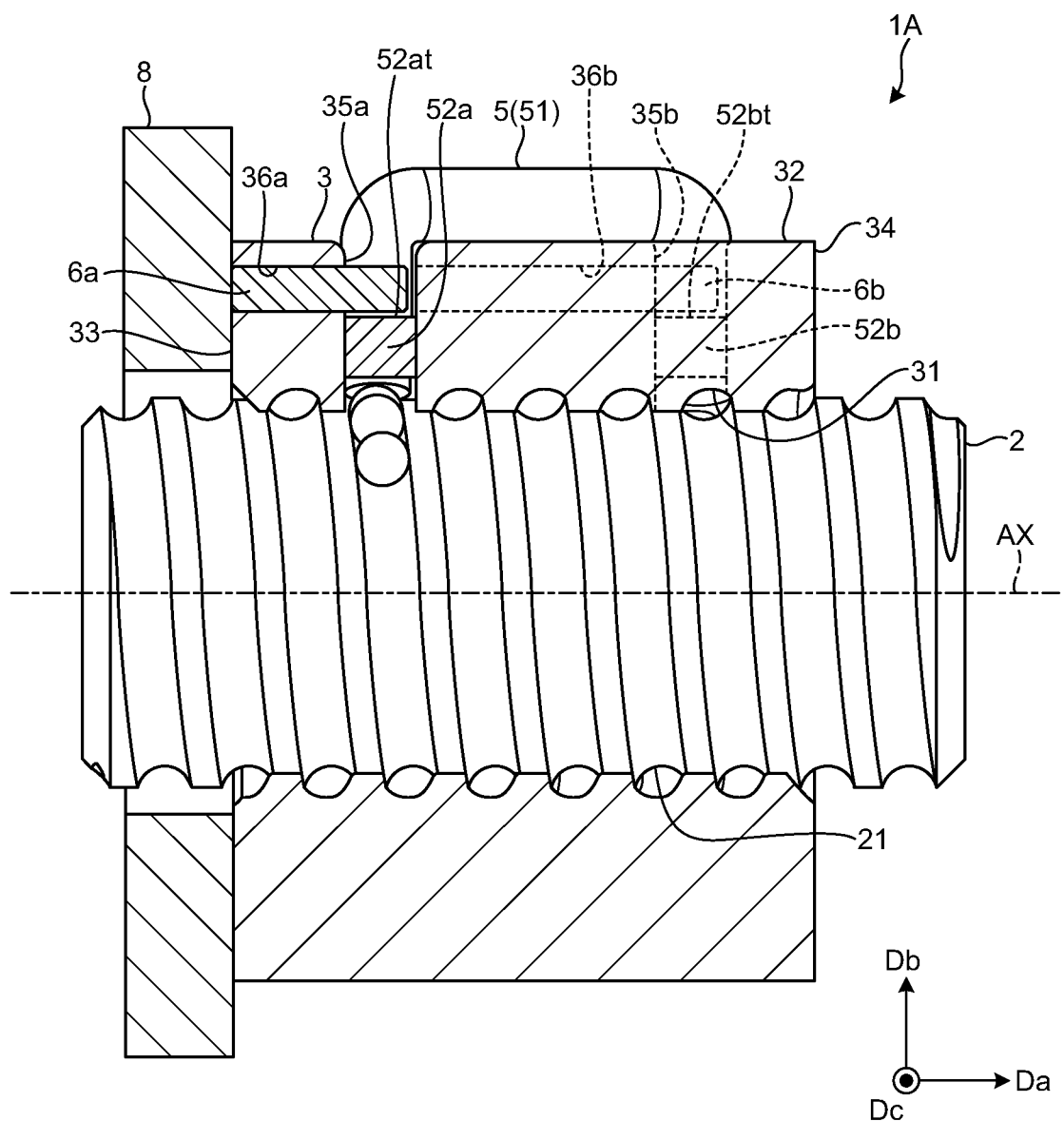
FIG. 11 is a sectional view cut along the line XI-XI' in FIG. 10.

FIG. 10 is a perspective view of a ball screw device according to a second embodiment. FIG. 11 is a sectional view cut along the line XI-XI' in FIG. 10. In the following explanation, the same reference numerals denote the same components as those described in the above embodiment, and their repeated description will be omitted.

As illustrated in FIG. 10 and FIG. 11, in a ball screw device 1A of the second embodiment, the second pin insertion hole 36b penetrates through the first end surface 33 and the inner wall of the second through hole 35b. In other words, the second pin insertion hole 36b is opened on the first end surface 33 on which the first pin insertion hole 36a is also opened. The second end surface 34 is not provided with the first pin insertion hole 36a or the second pin insertion hole 36b. The length of the second pin component 6b in the axis direction is longer than the length of the first pin component 6a in the axis direction. The second pin component 6b is inserted into the second pin insertion hole 36b, and in the second through hole 35b, is positioned outside of the second leg part 52b in the radial direction. Consequently, the first pin component 6a and the second pin component 6b can retain the circulation component 5.

The ball screw device 1A also includes a lid component 8. The lid component 8 is an annular member having a through hole. The screw shaft 2 penetrates through the through hole of the lid component 8. The lid component 8 is provided to face the first end surface 33, and covers at least the openings of the first pin insertion hole 36a and the second pin insertion hole 36b. Consequently, the ball screw device 1A can suppress the first pin component 6a and the second pin component 6b from coming out from the corresponding first pin insertion hole 36a and the second pin insertion hole 36b.

The shape of the lid component 8 may be changed as appropriate. For example, the lid component 8 may be substituted by a housing of various devices such as a manufacturing device and a machining tool to which the ball screw device 1A is to be incorporated. The lid component 8 is also applicable to the ball screw device 1 of the first embodiment and embodiments to be described below.

As described above, in the ball screw device 1A of the second embodiment, the nut 3 is provided with the first through hole 35a, the second through hole 35b, the first pin insertion hole 36a, and the second pin insertion hole 36b. The first leg part 52a is inserted into the first through hole 35a. The second leg part 52b is inserted into the second through hole 35b. The first pin insertion hole 36a is provided in a direction parallel to the axis direction of the nut 3, and penetrates through the first end surface 33 of the nut 3 in the axis direction, and the inner wall of the first through hole 35a. The second pin insertion hole 36b is provided in the direction parallel to the axis direction of the nut 3, and penetrates through the first end surface 33 and the inner wall of the second through hole 35b.

According to the above, the first pin insertion hole 36a and the second pin insertion hole 36b are provided on the same first end surface 33. Thus, the first pin component 6a and the second pin component 6b can be easily inserted into the first pin insertion hole 36a and the second pin insertion hole 36b. Even in a case when one of the end surfaces (for example, the second end surface 34) of the nut 3 cannot be processed, it is possible to provide the first pin insertion hole 36a and the second pin insertion hole 36b on the nut 3. Moreover, by providing the lid component 8 on one of the end surfaces, it is possible to suppress the first pin component 6a and the second pin component 6b from coming out from the corresponding first pin insertion hole 36a and the second pin insertion hole 36b.

Third Embodiment

Figure 12:
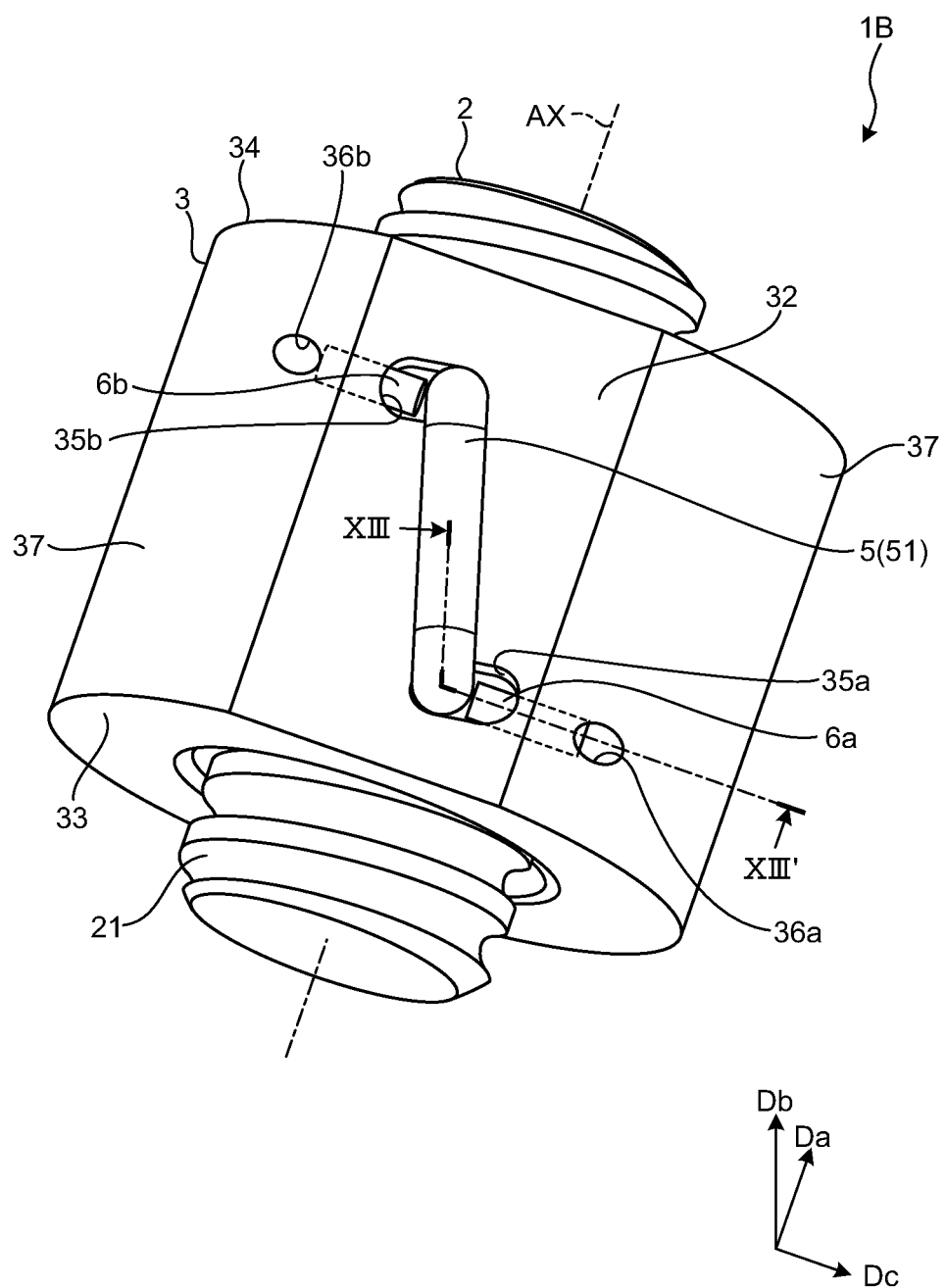
FIG. 12 is a perspective view of a ball screw device according to a third embodiment.
Figure 13:
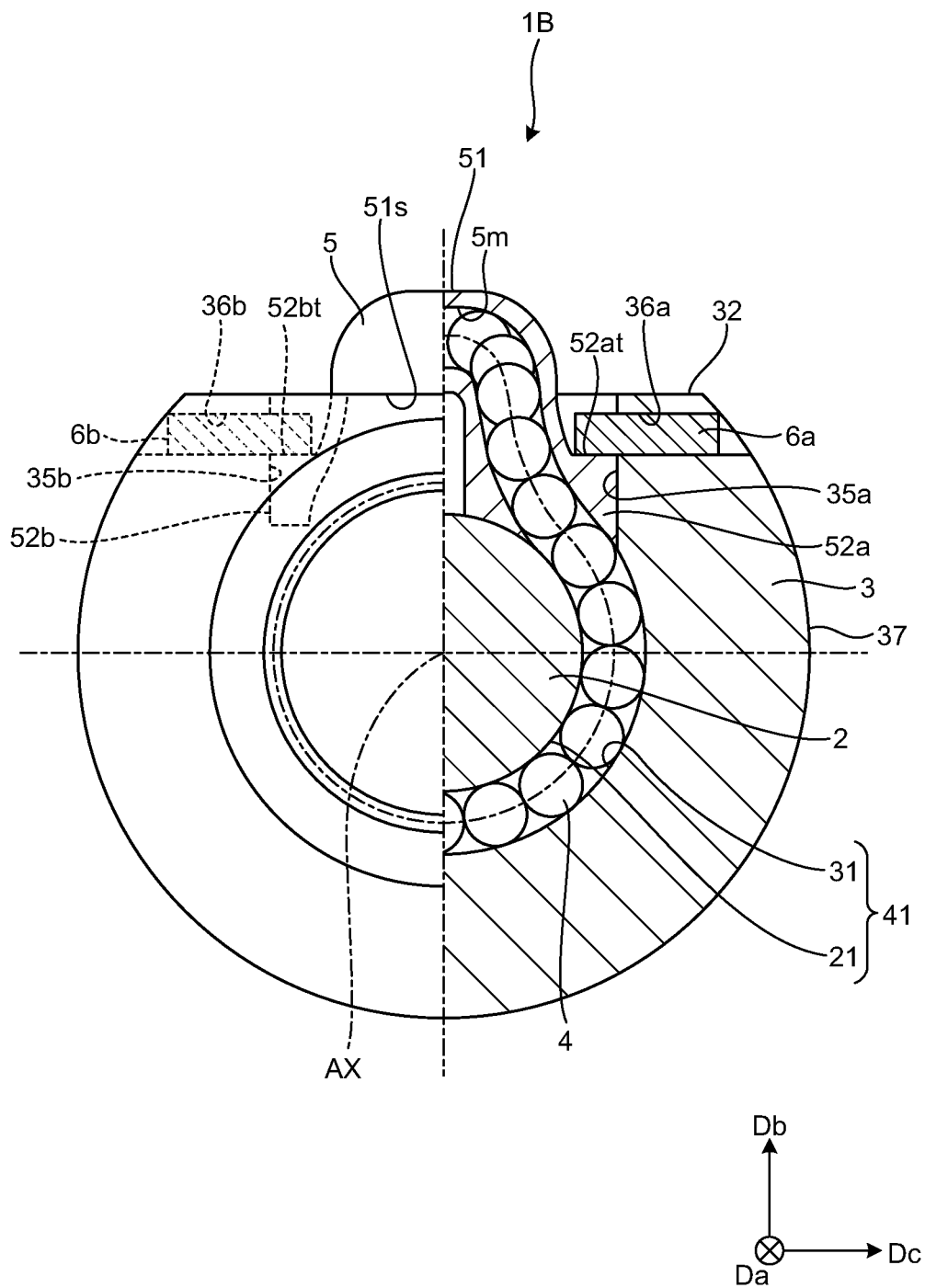
FIG. 13 is a partial sectional view of the ball screw device according to the third embodiment.

FIG. 12 is a perspective view of a ball screw device according to a third embodiment. FIG. 13 is a partial sectional view of a ball screw device according to the third embodiment. FIG. 13 illustrates a partial section of a ball screw device 1B, and illustrates a section cut along the line XIII-XIII' illustrated in FIG. 12.

As illustrated in FIG. 12, in the ball screw device 1B of the third embodiment, the first pin insertion hole 36a is provided in a direction parallel to the first end surface 33, and in a direction intersecting with the first through hole 35a. The first pin insertion hole 36a penetrates through the outer peripheral surface 37 of the nut 3 and the inner wall of the first through hole 35a. In the present embodiment, the outer peripheral surface 37 is a portion where the flat surface 32 is not provided in the outer peripheral surface of the nut 3.

Similarly, the second pin insertion hole 36b is provided in a direction parallel to the second end surface 34 and in a direction intersecting with the second through hole 35b. The second pin insertion hole 36b penetrates through the outer peripheral surface 37 of the nut 3 and the inner wall of the second through hole 35b.

As illustrated in FIG. 12 and FIG. 13, the first pin component 6a is inserted into the first pin insertion hole 36a, and protrudes from the inner wall of the first through hole 35a in the third direction Dc. In the first through hole 35a, the first pin component 6a is positioned outside of the first leg part 52a in the radial direction. In other words, the first pin component 6a includes a portion provided in the first pin insertion hole 36a and a portion overlapping with the upper surface 52at of the first leg part 52a.

Similarly, the second pin component 6b is inserted into the second pin insertion hole 36b, and in the second through hole 35b, is positioned outside of the second leg part 52b in the radial direction. With such a configuration, similar to the first embodiment, the ball screw device 1B can retain the circulation component 5 by the first pin component 6a and the second pin component 6b.

The end part of the first pin component 6a in the third direction Dc is separated from and faces the side surface of the main body part 51. However, it is not limited thereto. The end part of the first pin component 6a in the third direction Dc may come into contact with the side surface of the main body part 51. Moreover, similarly, the end part of the second pin component 6b in the third direction Dc may come into contact with the side surface of the main body part 51. The end part of the first pin component 6a at the outer peripheral surface 37 side is provided at the inner side of the outer peripheral surface 37 in the radial direction. The same applies to the second pin component 6b. Consequently, when another component or the like is to be attached to the outer periphery of the nut 3, it is possible to suppress the first pin component 6a and the second pin component 6b from coming into contact with another member. The end parts of the first pin component 6a and the second pin component 6b at the outer peripheral surface 37 side may protrude outward from the outer peripheral surface 37 in the radial direction.

In the ball screw device 1B, the first pin insertion hole 36a and the second pin insertion hole 36b are each opened on the outer peripheral surface 37, and the first pin insertion hole 36a and the second pin insertion hole 36b are not provided on the first end surface 33 and the second end surface 34. Hence, even in a case when the first end surface 33 and the second end surface 34 of the nut 3 cannot be processed, it is possible to provide the first pin insertion hole 36a and the second pin insertion hole 36b on the nut 3. Moreover, even in a case when another component or the like is provided on the first end surface 33 and the second end surface 34 of the nut 3, the first pin component 6a and the second pin component 6b can be inserted into the corresponding first pin insertion hole 36a and the second pin insertion hole 36b, from the outer peripheral surface 37 side of the nut 3.

The configuration of the third embodiment may be combined with the configuration described in the first embodiment or the second embodiment described above. For example, in the ball screw device 1 of the first embodiment, one of the first pin insertion hole 36a and the second pin insertion hole 36b may be provided so as to penetrate through the outer peripheral surface 37 of the nut 3 and the inner wall of the through hole (first through hole 35a or second through hole 35b).

Fourth Embodiment

Figure 14:
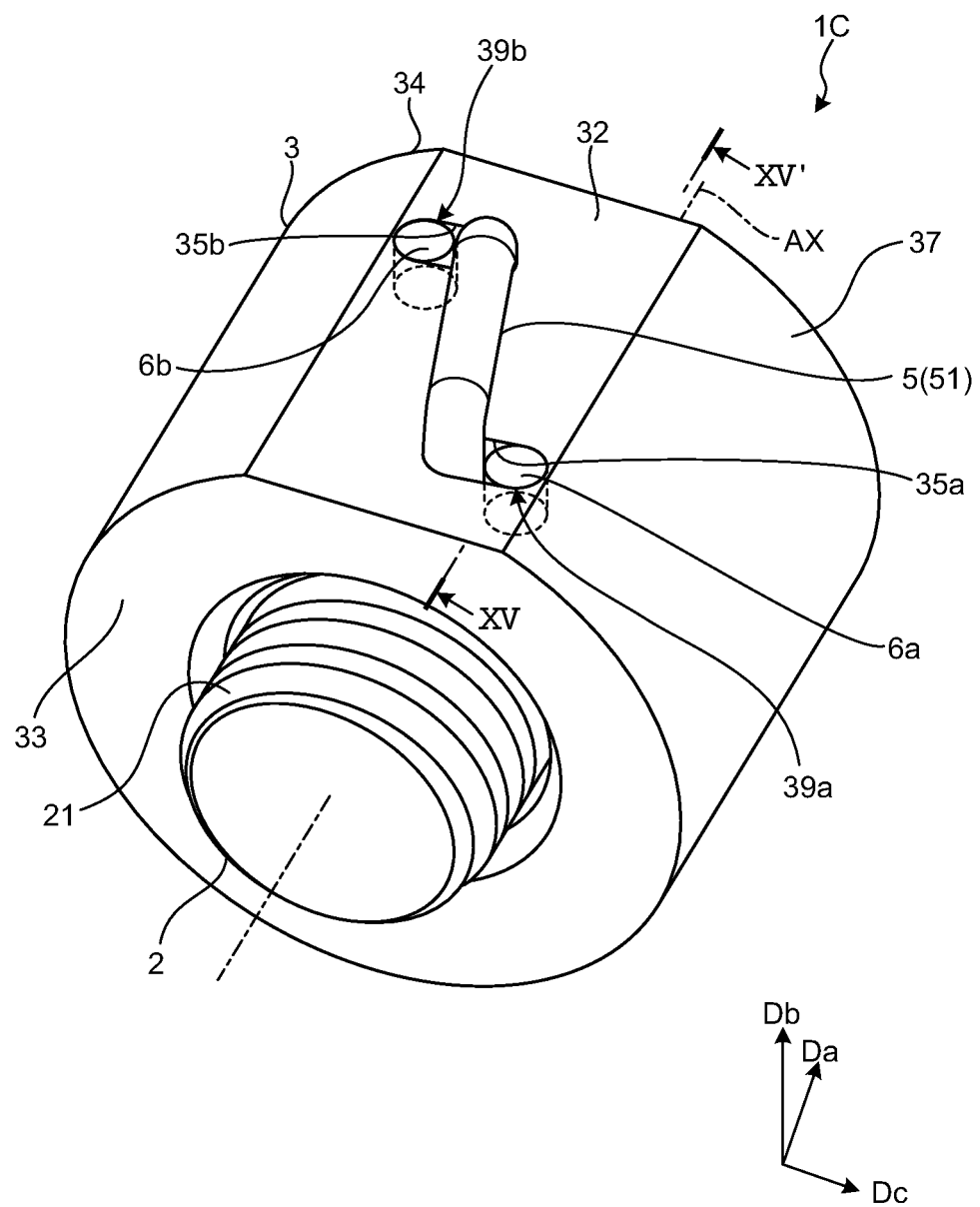
FIG. 14 is a perspective view of a ball screw device according to a fourth embodiment.
Figure 15:
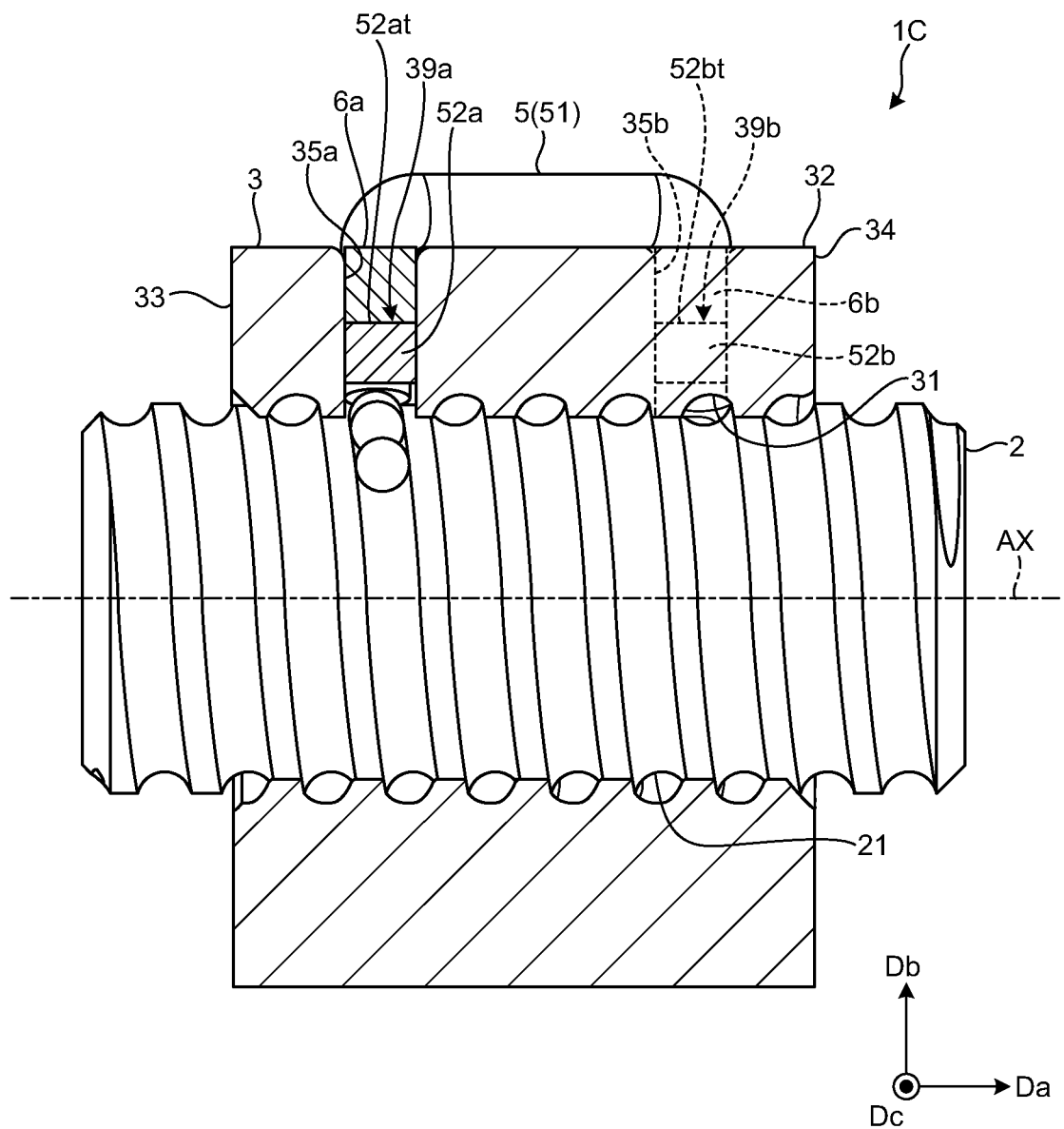
FIG. 15 is a sectional view cut along the line XV-XV' in FIG. 14.

FIG. 14 is a perspective view of a ball screw device according to a fourth embodiment. FIG. 15 is a sectional view cut along the line XV-XV' in FIG. 14. As illustrated in FIG. 14 and FIG. 15, the configuration of a ball screw device 1C of the fourth embodiment is different from those of the first embodiment to the third embodiment described above in that the first pin insertion hole 36a and the second pin insertion hole 36b are not provided on the nut 3.

The first pin component 6a is inserted into a first pin insertion part 39a provided in the first through hole 35a. The first pin insertion part 39a is space surrounded by the inner wall of the first through hole 35a, the upper surface 52at of the first leg part 52a, and the side surface of the main body part 51 at one end side. The axis direction of the first pin component 6a is provided along the second direction Db, and the outer peripheral surface of the first pin component 6a comes into contact with the inner wall of the first through hole 35a. Consequently, the first pin component 6a is provided radially outside of the first leg part 52a, and is fixed to the inside of the first through hole 35a.

Similarly, the second pin component 6b is inserted into a second pin insertion part 39b provided in the second through hole 35b. The second pin insertion part 39b is space surrounded by the inner wall of the second through hole 35b, the upper surface 52bt of the second leg part 52b, and the side surface of the main body part 51 at the other end side. Consequently, the second pin component 6b is provided radially outside of the second leg part 52b, and is fixed to the inside of the second through hole 35b. In the present embodiment also, the ball screw device 1C can retain the circulation component 5 by the first pin component 6a and the second pin component 6b.

Moreover, the ball screw device 1C can omit the process of forming the first pin insertion hole 36a and the second pin insertion hole 36b on the nut 3. Consequently, the ball screw device 1C can suppress the manufacturing cost.

The configuration of the fourth embodiment may be combined with any configuration described in the first embodiment to the third embodiment above. For example, in the ball screw device 1 of the first embodiment, one of the first pin insertion hole 36a and the second pin insertion hole 36b may be omitted. For example, when the second pin insertion hole 36b is not provided, the second pin component 6b may be inserted into the first pin insertion part 39a provided in the second through hole 35b.

Fifth Embodiment

Figure 16:
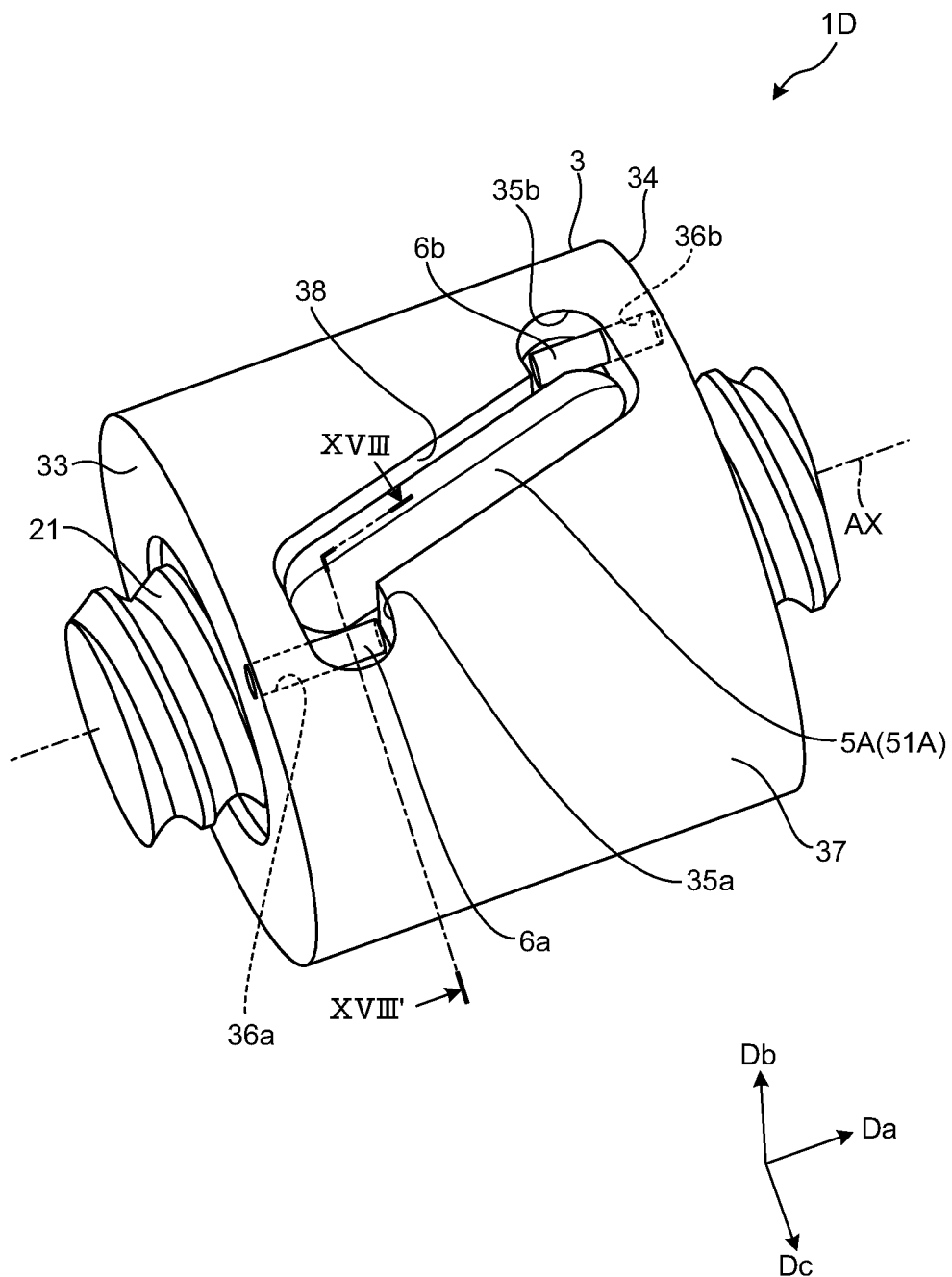
FIG. 16 is a perspective view of a ball screw device according to a fifth embodiment.
Figure 17:
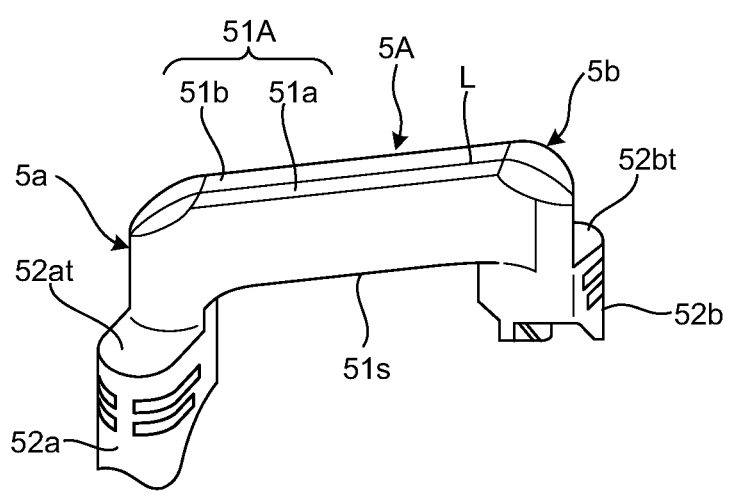
FIG. 17 is a perspective view of a circulation component in the ball screw device according to the fifth embodiment.
Figure 18:
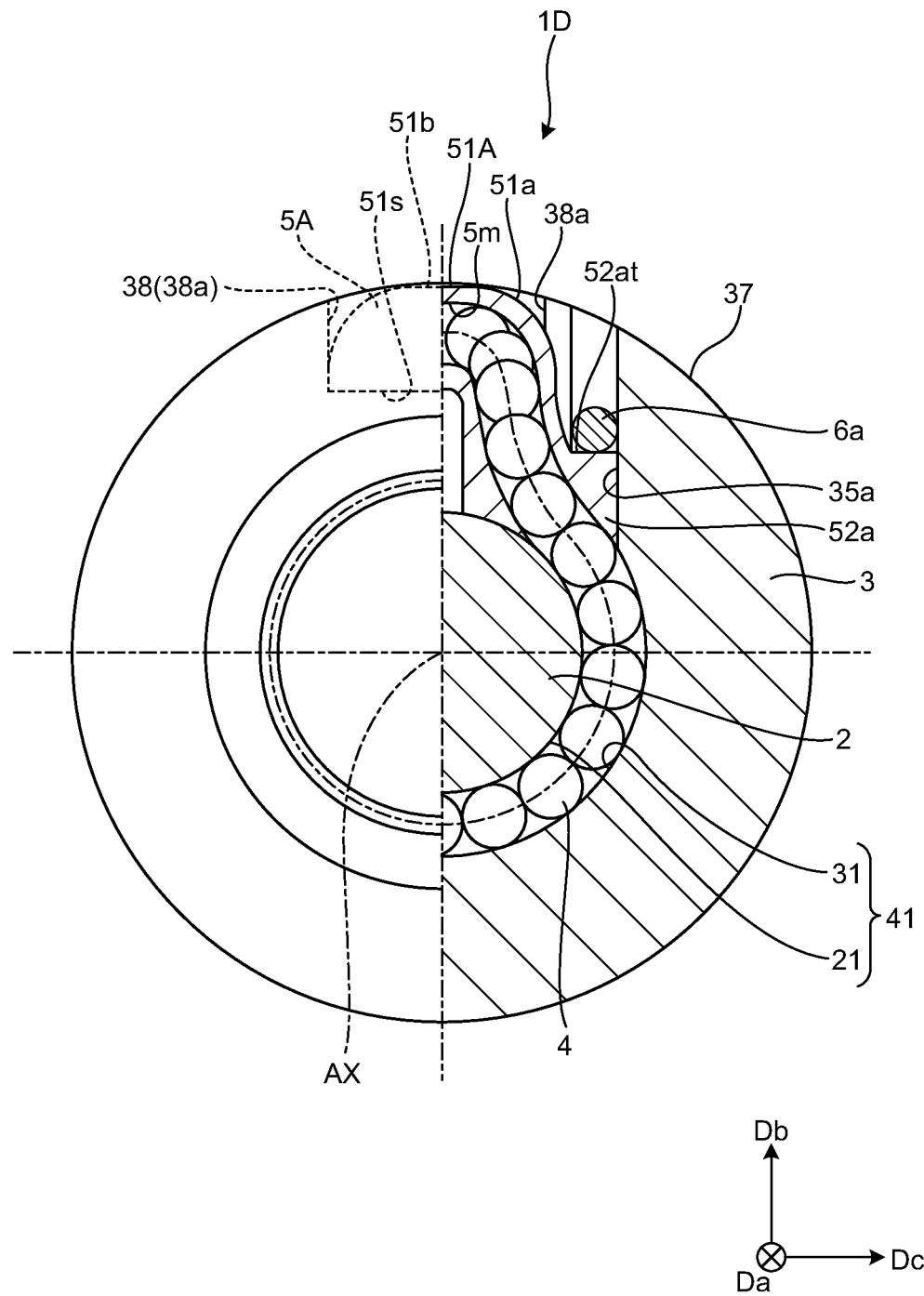
FIG. 18 is a partial sectional view of the ball screw device according to the fifth embodiment.

FIG. 16 is a perspective view of a ball screw device according to a fifth embodiment. FIG. 17 is a perspective view of a circulation component in the ball screw device according to the fifth embodiment. FIG. 18 is a partial sectional view of the ball screw device according to the fifth embodiment. FIG. 18 illustrates a partial section of a ball screw device 1D, and illustrates a section cut along the line XVIII-XVIII' illustrated in FIG. 16.

As illustrated in FIG. 16, the configuration of the ball screw device 1D of the present embodiment is different from those of the first embodiment to the fourth embodiment described above in that the flat surface 32 is not provided on the outer peripheral surface 37 of the nut 3 and that a circulation component attachment groove 38 is provided. One end side of the circulation component attachment groove 38 communicates with the first through hole 35a, and the other end side of the circulation component attachment groove 38 communicates with the second through hole 35b. A main body part 51A of a circulation component 5A is provided in the circulation component attachment groove 38.

As illustrated in FIG. 17, the circulation component 5A includes two divided bodies 5a and 5b divided along a line L indicating the moving direction of the balls 4. The divided body 5a includes a divided main body part 51a and the first leg part 52a. The divided body 5b includes a divided main body part 51b and the second leg part 52b. By combining the divided body 5a and the divided body 5b, the circulation component 5A is formed. A tubular-shaped main body part 51 is formed by coupling the divided main body part 51a and the divided main body part 51b, and the first leg part 52a and the second leg part 52b are provided on both ends of the main body part 51. The divided bodies 5a and 5b are each formed by injection molding of synthetic resin. The divided bodies 5a and 5b have the same shape. However, it is not limited thereto, and the divided bodies 5a and 5b may have different shapes.

As illustrated in FIG. 18, the divided main body part 51a and the divided main body part 51b are provided in the circulation component attachment groove 38. In the peripheral direction of the nut 3, the divided main body part 51a and the divided main body part 51b are held by an inner wall 38a of the circulation component attachment groove 38. Consequently, even if the force is applied by the balls 4, the displacement of the main body part 51A is suppressed. More specifically, the ball screw device 1D can suppress the divided body 5a and the divided body 5b from separating in the peripheral direction of the nut 3.

The configuration of the first pin component 6a, the second pin component 6b, the first pin insertion hole 36a, and the second pin insertion hole 36b is the same as that of the ball screw device 1 in the first embodiment, and the detailed description is omitted. Because the first leg part 52a and the second leg part 52b of the circulation component 5A are retained in the nut 3 by the corresponding first pin component 6a and the second pin component 6b, there is no need to provide a member for fixing the main body part 51A on the circulation component attachment groove 38 and the upper side of the main body part 51A. Thus, compared to a configuration in which the circulation component 5A is fixed by providing an attachment component on the upper side of the main body part 51A, the size of the ball screw device 1D can be reduced.

Because the main body part 51A is provided in the circulation component attachment groove 38, compared to a configuration in which the main body part 51A is provided on the flat surface 32 of the nut 3, the outer peripheral area of the nut 3 can be secured. Consequently, in the case of attaching another component or the like on the outer periphery of the nut 3, a restriction on the attachment position of another component or the like is reduced, and flexibility can be increased. Moreover, because the main body part 51A is provided in the circulation component attachment groove 38, it is possible to suppress the main body part 51A from coming into contact with an external component, when another component or the like is to be attached to the outer periphery of the nut 3, or when the ball screw device 1D is incorporated into various devices such as a manufacturing device and a machining tool.

Moreover, in the present embodiment, the retaining structure of the circulation component 5A is the same as that of the ball screw device 1 in the first embodiment. However, it is not limited thereto. The configuration of the present embodiment is also applicable to the ball screw devices 1A, 1B, and 1C in the second embodiment to the fourth embodiment.

Third Modification

Figure 19:
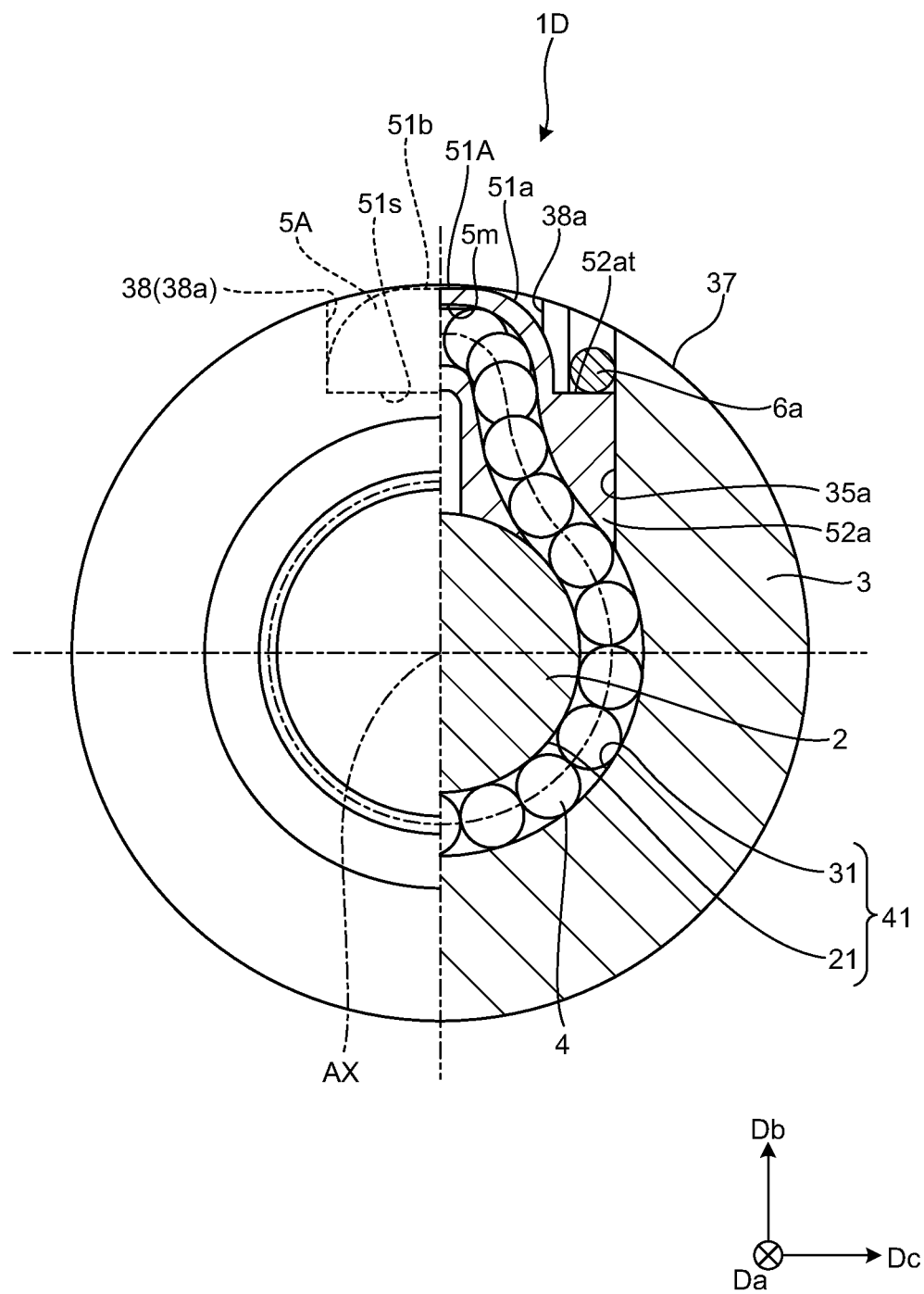
FIG. 19 is a partial sectional view of a ball screw device according to a third modification of the fifth embodiment.

FIG. 19 is a partial sectional view of a ball screw device according to a third modification of the fifth embodiment. As illustrated in FIG. 19, in the ball screw device 1D of the third modification, in a direction orthogonal to the lower surface 51s of the main body part 51A of the circulation component 5A, the lower surface 51s of the main body part 51A is positioned at the same position as the upper surface 52at of the first leg part 52a. Namely, the upper surface 52at of the first leg part 52a and the bottom surface of the circulation component attachment groove 38 are disposed on the same surface. In the third modification, the position of the upper surface 52at of the first leg part 52a may be displaced or tilted in manufacturing. That is, in the direction perpendicular to the lower surfaced 51s, at least a part of the upper surface 52at of the first leg part 52a may be positioned at the same position as the lower surface 51s of the main body part 51A. The description on the first leg part 52a is also applicable to the second leg part 52b.

With such a configuration, as illustrated in the fifth embodiment, compared to when the upper surface 52at of the first leg part 52a is provided at a position different from that of the lower surface 51s of the main body part 51A, for example, at a position close to the center axis AX of the nut 3, the first leg part 52a can be formed thicker. Hence, the ball screw device 1D can improve the durability of the circulation component 5A.

Sixth Embodiment

Figure 20:
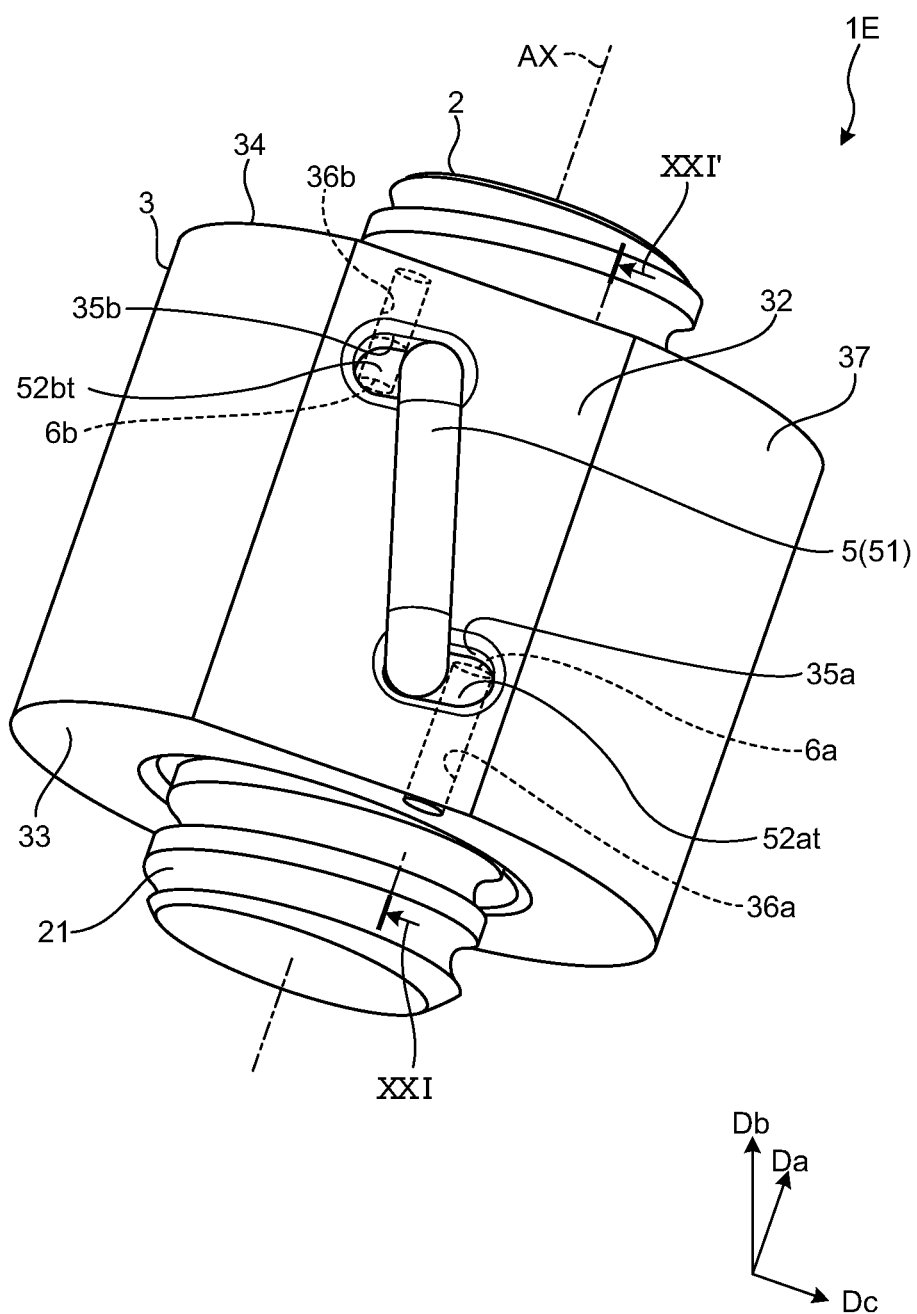
FIG. 20 is a perspective view of a ball screw device according to a sixth embodiment.
Figure 21:
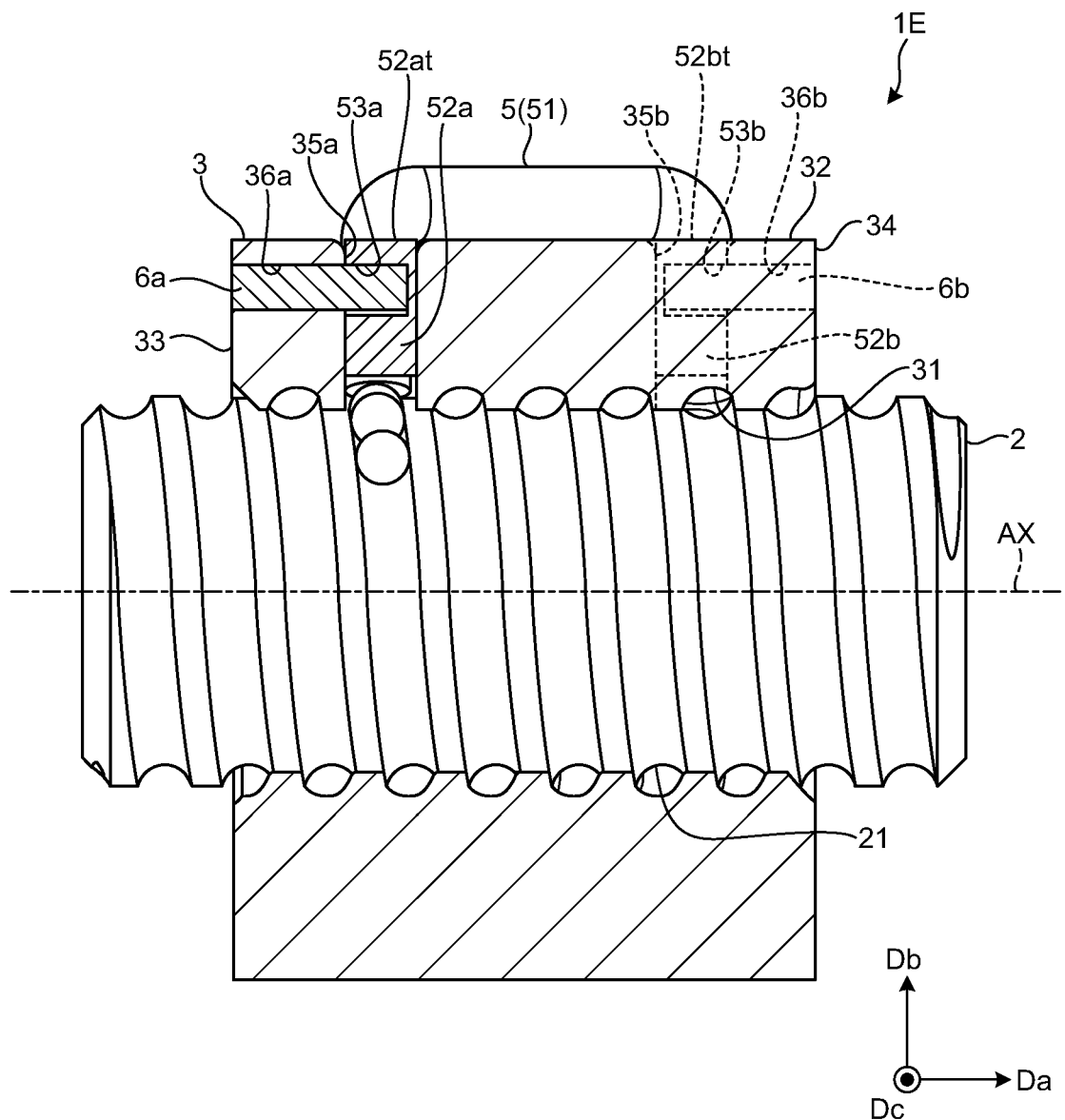
FIG. 21 is a sectional view cut along the line XXI-XXI' in FIG. 20.

FIG. 20 is a perspective view of a ball screw device according to a sixth embodiment. FIG. 21 is a sectional view cut along the line XXI-XXI' in FIG. 20. In the first embodiment to the fifth embodiment described above, the first pin component 6a and the second pin component 6b are disposed radially outside of the corresponding first leg part 52a and the second leg part 52b. However, it is not limited thereto. In a ball screw device 1E of the sixth embodiment, the first pin component 6a is provided in a first pin insertion concave part 53a that is provided on the first leg part 52a, and the second pin component 6b is provided in a second pin insertion concave part 53b that is provided on the second leg part 52b.

More specifically, as illustrated in FIG. 20, the configuration of the first pin insertion hole 36a and the second pin insertion hole 36b is the same as that of the first embodiment. The upper surface 52at of the first leg part 52a is exposed to the first through hole 35a, and the upper surface 52bt of the second leg part 52b is exposed to the second through hole 35b.

As illustrated in FIG. 21, the length of the first leg part 52a in the second direction Db is longer than that of the first leg part 52a illustrated in the first embodiment to the fifth embodiment. The upper surface 52at of the first leg part 52a is provided at a position close to the flat surface 32. The upper surface 52at may be provided on the same surface as that of the flat surface 32, or may be provided at a position where a step is formed with the flat surface 32.

The first leg part 52a is provided at a position overlapping with the opening of the first pin insertion hole 36a. The first pin insertion concave part 53a is provided on the first leg part 52a. The first pin insertion concave part 53a is provided so as to be recessed in the first direction Da from the side surface of the first leg part 52a. The opening of the first pin insertion concave part 53a is overlapped with the opening of the first pin insertion hole 36a.

The first pin component 6a is inserted across the first pin insertion hole 36a and the first pin insertion concave part 53a. In other words, the first pin component 6a includes a portion provided in the first pin insertion hole 36a and a portion provided in the first pin insertion concave part 53a. Consequently, when the inner surface of the first pin insertion concave part 53a and the first pin component 6a come into contact with each other, the displacement of the circulation component 5 can be suppressed.

Similarly, the second pin insertion concave part 53b is provided on the second leg part 52b. The opening of the second pin insertion concave part 53b is overlapped with the opening of the second pin insertion hole 36b. The second pin component 6b is inserted across the second pin insertion hole 36b and the second pin insertion concave part 53b. In other words, the second pin component 6b includes a portion provided in the second pin insertion hole 36b and a portion provided in the second pin insertion concave part 53b. Consequently, when the inner surface of the second pin insertion concave part 53b and the second pin component 6b come into contact with each other, the displacement of the circulation component 5 can be suppressed. Hence, the ball screw device 1E can retain the circulation component 5 with a simple configuration.

The configuration of the first pin component 6a, the second pin component 6b, the first pin insertion hole 36a, and the second pin insertion hole 36b is the same as that in the ball screw device 1 of the first embodiment. However, it is not limited thereto. The configuration of the present embodiment is also applicable to the ball screw devices 1A, 1B, and 1D of the second embodiment, the third embodiment, and the fifth embodiment described above. In this case, the positions and directions of the first pin insertion concave part 53a and the second pin insertion concave part 53b can be changed according to the positions and directions of the first pin insertion hole 36a and the second pin insertion hole 36b.

Fourth Modification

Figure 22:
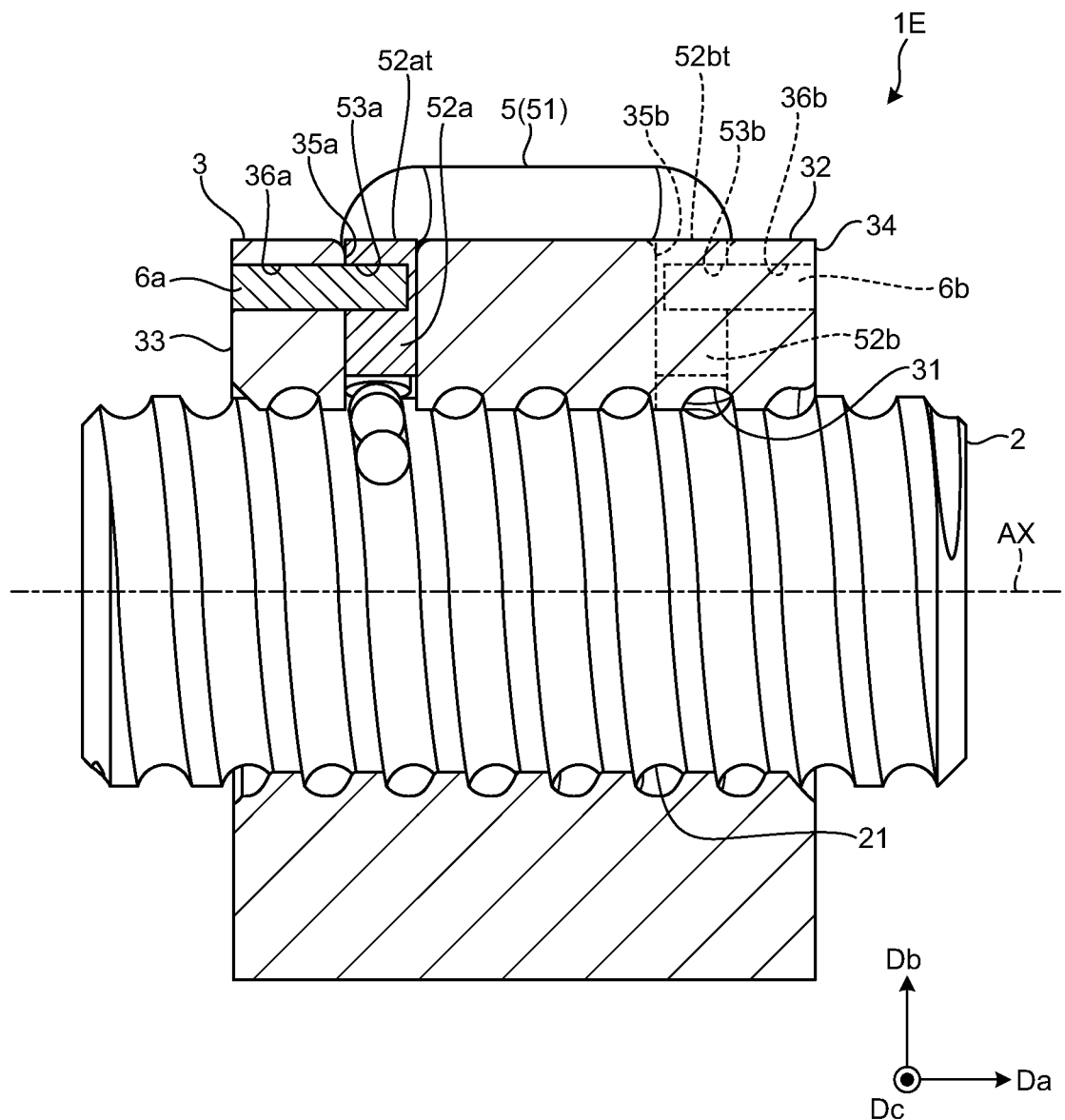
FIG. 22 is a sectional view of a ball screw device according to a fourth modification of the sixth embodiment.

FIG. 22 is a sectional view of a ball screw device according to a fourth modification of the sixth embodiment. The first pin insertion concave part 53a illustrated in FIG. 21 has the inner diameter larger than that of the first pin insertion hole 36a. However, it is not limited thereto. As illustrated in FIG. 22, in the ball screw device 1E of the fourth modification, the inner diameter of the first pin insertion concave part 53a is equivalent to that of the first pin insertion hole 36a. In this case, the first pin component 6a is pressed into the first pin insertion hole 36a, and pressed into the first pin insertion concave part 53a provided on the first leg part 52a. Thus, the first pin component 6a is fitted into the first pin insertion hole 36a and the first pin insertion concave part 53a while coming into contact with the inner wall of the first pin insertion hole 36a and the inner wall of the first pin insertion concave part 53a. The description on the first pin component 6a and the first pin insertion concave part 53a is also applicable to the second pin component 6b and the second pin insertion concave part 53b.

According to the above, the ball screw device 1E can suppress the first pin component 6a from coming out from the first pin insertion concave part 53a, and can retain the first leg part 52a without fail. Moreover, compared to that of the sixth embodiment, even when the force is applied to the circulation component 5 by the balls 4, the ball screw device 1E can suppress the displacement of the circulation component 5, and accurately position the circulation component 5.

REFERENCE SIGNS LIST 1, 1A, 1B, 1C, 1D, 1E ball screw device
2 screw shaft
3 nut
4 ball
5, 5A circulation component
6a, 6Aa first pin component
6b, 6Ab second pin component
8 lid component
21 first thread groove
31 second thread groove
32 flat surface
33 first end surface
34 second end surface
35a first through hole
35b second through hole
36a first pin insertion hole
36b second pin insertion hole
37 outer peripheral surface
38 circulation component attachment groove
39a first pin insertion part
39b second pin insertion part
51, 51A main body part
52a first leg part
52b second leg part
53a first pin insertion concave part
53b second pin insertion concave part

The invention claimed is:

1. A ball screw device, comprising:
a screw shaft, an outer peripheral surface of the screw shaft having a first thread groove;
a nut, an inner peripheral surface of the nut being provided with a second thread groove that matches the first thread groove, and an outer peripheral surface of the nut being provided with through holes;
a plurality of balls that roll between the first thread groove and the second thread groove;
a circulation component including a main body part and a pair of leg parts provided on both ends of the main body part, the circulation component being provided on the nut; and
a pin component that fixes the circulation component to the nut, wherein
each of the leg parts is inserted into the an associated one of the through holes, and
a side surface of the pin component faces a radially outside surface of at least one of the leg parts such that the pin component is provided on the radially outside surface of the at least one leg part in an overlapping manner, and the at least one leg part is retained in the through hole by the pin component.

2. The ball screw device according to claim 1, wherein
the nut is provided with a pin insertion hole that is provided in a direction parallel to an axis direction of the nut, and that penetrates through an end surface of the nut in the axis direction and an inner wall of the through hole, and
the pin component is provided in the pin insertion hole.

3. The ball screw device according to claim 2, wherein a lid component that covers an opening of the pin insertion hole is provided on the end surface.

4. The ball screw device according to claim 1, wherein
the circulation component includes a first leg part provided on one end side of the main body part, and a second leg part provided on another end side of the main body part, the first and second leg parts corresponding to the pair of leg parts, and
the nut is provided with
the through holes corresponding to a first through hole into which the first leg part is inserted, and a second through hole into which the second leg part is inserted,
a first pin insertion hole that is provided in a direction parallel to the axis direction of the nut, and that penetrates through a first end surface of the nut in the axis direction and an inner wall of the first through hole, and
a second pin insertion hole that is provided in a direction parallel to the axis direction of the nut, and that penetrates through a second end surface on a side opposite to the first end surface and an inner wall of the second through hole.

5. The ball screw device according to claim 2, wherein
the circulation component includes a first leg part provided on one end side of the main body part, and a second leg part provided on another end side of the main body part, the first and second leg parts corresponding to the pair of leg parts, and
the nut is provided with
the through holes corresponding to a first through hole into which the first leg part is inserted, and a second through hole into which the second leg part is inserted,
a first pin insertion hole that is provided in a direction parallel to the axis direction of the nut, and that penetrates through a first end surface of the nut in the axis direction and an inner wall of the first through hole, and
a second pin insertion hole that is provided in a direction parallel to the axis direction of the nut, and that penetrates through the first end surface and an inner wall of the second through hole.

6. The ball screw device according to claim 1, wherein
the nut is provided with a pin insertion hole that is provided in a direction parallel to an end surface of the nut in an axis direction, and in a direction intersecting with the through hole, and that penetrates through an outer peripheral surface of the nut and an inner wall of the through hole, and
the pin component is provided in the pin insertion hole.

7. A ball screw device, comprising:
a screw shaft, an outer peripheral surface of the screw shaft having a first thread groove;
a nut, an inner peripheral surface of the nut being provided with a second thread groove that matches the first thread groove, and an outer peripheral surface of the nut being provided with through holes;
a plurality of balls that roll between the first thread groove and the second thread groove;
a circulation component including a main body part and a pair of leg parts provided on both ends of the main body part, the circulation component being provided on the nut; and
a pin component that fixes the circulation component to the nut, wherein
each of the leg parts is inserted into an associated one of the through holes,
the pin component is provided on the leg part in an overlapping manner,
at least one of the leg parts is retained in the associated through hole by the pin component, and the pin component is inserted into a pin insertion part surrounded by an inner wall of the associated through hole and an upper surface of the leg part such that an end surface of the pin component retains the upper surface of the at least one leg part and retains the at least one leg part.

8. A ball screw device, comprising:
a screw shaft, an outer peripheral surface of the screw shaft having a first thread groove;
a nut, an inner peripheral surface of the nut being provided with a second thread groove that matches the first thread groove, and an outer peripheral surface of the nut being provided with through holes;
a plurality of balls that roll between the first thread groove and the second thread groove;
a circulation component including a main body part and a pair of leg parts provided on both ends of the main body part, the circulation component being provided on the nut; and
a pin component that fixes the circulation component to the nut, wherein
each of the leg parts is inserted into an associated one of through holes, and
the pin component is inserted from both end surfaces of the nut into a pin insertion concave part provided so as to be recessed on the leg part, and the leg part is retained in the associated through hole by the pin component.

9. The ball screw device according to claim 8, wherein
the nut is provided with a pin insertion hole that is provided in a direction parallel to an axis direction of the nut, and that penetrates through an end surface of the nut in the axis direction and an inner wall of the through hole, and
the pin component is pressed into the pin insertion concave part provided on the leg part and the pin insertion hole.

10. The ball screw device according to claim 1, wherein
a circulation component attachment groove that communicates with the through hole is provided on the outer peripheral surface of the nut, and
the main body part is provided in the circulation component attachment groove.

11. The ball screw device according to claim 10, wherein in a direction perpendicular to a lower surface of the main body part of the circulation component, the lower surface of the main body part is positioned at a same position as the upper surface of the leg part.

12. The ball screw device according to claim 2, wherein
the pin insertion hole intersects with the through hole, and is provided from one end surface side of the nut in the axis direction to another end surface side of the nut in the axis direction beyond the through hole, and
the pin component is provided in the pin insertion hole.

13. The ball screw device according to claim 1, wherein
the pin component includes a first portion and a second portion coupled to each other in a longitudinal direction of the pin component, and an outer diameter of the second portion is larger than an outer diameter of the first portion, and the second portion is provided in the through hole.

14. The ball screw device according to claim 8, wherein
a circulation component attachment groove that communicates with the through hole is provided on the outer peripheral surface of the nut, and the main body part is provided in the circulation component attachment groove.

15. The ball screw device according to claim 14, wherein in a direction perpendicular to a lower surface of the main body part of the circulation component, the lower surface of the main body part is positioned at a same position as the upper surface of the leg part.

16. The ball screw device according to claim 9, wherein
the pin insertion hole intersects with the through hole, and is provided from one end surface side of the nut in the axis direction to another end surface side of the nut in the axis direction beyond the through hole, and the pin component is provided in the pin insertion hole.

17. The ball screw device according to claim 9, wherein
the pin component includes a first portion and a second portion coupled to each other in a longitudinal direction of the pin component, and an outer diameter of the second portion is larger than an outer diameter of the first portion, and the second portion is provided in the through hole.

* * * * *